(12) United States Patent
Guo et al.

(10) Patent No.: US 11,228,942 B2
(45) Date of Patent: Jan. 18, 2022

(54) SCHEDULING DATA TRAFFIC IN WIRELESS TIME SENSITIVE NETWORKS

(71) Applicant: Mitsubishi Electric Research Laboratories, Inc., Cambridge, MA (US)

(72) Inventors: Jianlin Guo, Cambridge, MA (US); Kyeong Jin Kim, Cambridge, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 27 days.

(21) Appl. No.: 16/832,956

(22) Filed: Mar. 27, 2020

(65) Prior Publication Data

US 2021/0306910 A1 Sep. 30, 2021

(51) Int. Cl.
| | | |
|---|---|---|
| H04W 4/00 | (2018.01) | |
| H04W 28/08 | (2009.01) | |
| H04W 72/08 | (2009.01) | |
| H04L 12/725 | (2013.01) | |
| H04W 28/26 | (2009.01) | |
| H04L 12/841 | (2013.01) | |

(52) U.S. Cl.
CPC ..... *H04W 28/0908* (2020.05); *H04L 45/3065* (2013.01); *H04L 47/286* (2013.01); *H04W 28/26* (2013.01); *H04W 72/08* (2013.01)

(58) Field of Classification Search
None
See application file for complete search history.

(56) References Cited

U.S. PATENT DOCUMENTS

| | | | | |
|---|---|---|---|---|
| 10,853,308 | B1* | 12/2020 | Subramanian | .... G06F 15/17331 |
| 2003/0023469 | A1* | 1/2003 | Lee | ......... G06Q 10/08 705/13 |
| 2011/0282565 | A1* | 11/2011 | Law | ....... G08G 5/065 701/117 |
| 2019/0081903 | A1* | 3/2019 | Kobayashi | .......... H04L 47/6275 |
| 2019/0121781 | A1* | 4/2019 | Kasichainula | .... G06F 15/17331 |
| 2019/0158620 | A1* | 5/2019 | Oge | .................... H04L 67/2847 |
| 2019/0253339 | A1* | 8/2019 | Mehmedagic | ...... H04L 45/3065 |
| 2020/0228463 | A1* | 7/2020 | Kiessling | ............ H04L 47/2416 |

(Continued)

*Primary Examiner* — Elisabeth Benoit Magloire
(74) *Attorney, Agent, or Firm* — Gennadiy Vinokur; Hironori Tsukamoto

(57) ABSTRACT

Systems and methods for scheduling data traffic in a wireless time sensitive network (TSN). A computer configured to synchronize clocks of all nodes with a common clock in the TSN. Obtain data traffic information for the TSN using a network scheduler to establish routing paths. Determine routing paths using the obtained data traffic information and stored routing information via a memory. Compute a link communication delay for each link of the one or more relay nodes connecting a source node to a destination node of the TSN for each TSN stream using a network scheduler. Determine interfering links for each wireless link using the network scheduler. Determining a scheduling period using the network scheduler. Determine optimal scheduling using an optimal scheduling module. Generate the gate control list for each egress port of the wired node and the wireless transmitter of the TSN, and begin transmission of the data.

20 Claims, 16 Drawing Sheets

(56) References Cited

U.S. PATENT DOCUMENTS

2020/0259896 A1\* 8/2020 Sachs ................. G07C 9/00174
2020/0296050 A1\* 9/2020 Oge ...................... H04L 49/206
2021/0007160 A1\* 1/2021 Sivasiva Ganesan .......................
H04W 48/16

\* cited by examiner

| TSN Queue ID | TSN Stream index | Time offset | TX duration |
|---|---|---|---|
| 8 | Stream-1 | 0 | 10us |
| 7 | Stream-2 | 10us | 5us |
| 7 | Stream-3 | 15us | 8us |
| 6 | Stream-4 | 23us | 7us |
| 5 | Stream-5 | 30us | 3us |

FIG. 9A

| Time | Q8 | Q7 | Q6 | Q5 | Q4 | Q3 | Q2 | Q1 |
|---|---|---|---|---|---|---|---|---|
| 0  | o | c | c | c | c | c | c | c |
| 10 | c | o | c | c | c | c | c | c |
| 23 | c | c | o | c | c | c | c | c |
| 30 | c | c | c | o | c | c | c | c |
| 33 | c | c | c | c | x | x | x | x |

FIG. 9B (Autonomous driving car)

(Computer gaming)

SCHEDULING DATA TRAFFIC IN WIRELESS TIME SENSITIVE NETWORKS

FIELD

The present disclosure relates generally to schedule data traffic in communications networks, and more particularly to methods and apparatus for scheduling data traffic in time sensitive networks consisting of wired and wireless nodes.

BACKGROUND

Deterministic communication is important to many industries such as manufacturing, automotive and industrial automation, and smart grid. Providing determinism enables new levels of connectivity and optimization and leads to cost savings for many industries.

Time sensitive networking (TSN) is the technology to enable deterministic communications. IEEE 802.1 Working Group (WG) has been developing a set of the Ethernet based TSN standards to support deterministic communications over the standard Ethernet. IEEE 802.1 TSN aims to deliver time-critical traffic over the Standard Ethernet with the minimized jitter and upper bounded end-to-end delays for the real-time applications that require determinism.

There are two classes of nodes in a TSN network, i.e., end node and relay node. The end nodes represent devices that are data traffic sources and/or data traffic destinations. The data traffic source node can be referred to as the talker and the data traffic destination node can be referred to as the listener. The end nodes can perform separate functions according to protocol stack layers. However, end nodes do not relay data. The relay nodes represent network bridges and switches. They work at the link layer to form a network and route data traffic from the source to destination. IEEE 802.1Qca specifies the path reservation protocol to configure the link layer routing path in the TSN network. A routing path starts from the source node and ends at the destination node, which are connected by one or more relay nodes. However, as the link layer devices, relay nodes do not produce data traffic and do not consume data traffic. Therefore, relay node cannot be the source node or destination node.

TSN is designed to achieve determinism by using time synchronization and scheduling mechanism. Therefore, the time is the primary aspect of the TSN.

Using time synchronization, the nodes in the TSN network are required to share a common sense of time. In other words, all nodes are required to synchronize their clocks to a grandmaster clock. IEEE 1588 Precision Time Protocol (PTP) standards series and IEEE 802.1AS Timing and Synchronization standard series are designed to achieve high resolution clock synchronization in TSN networks. Once all nodes are synchronized to the grandmaster clock, the TSN network is ready to deliver traffic.

TSN enables the convergence of all traffic classes and multiple applications in one network.

TSN supports various traffic types such as periodic traffic, event-based traffic, streaming traffic and the best effort traffic. From the time perspective, these traffic can be divided into two types: (1) time critical traffic; (2) and the best effort traffic. In the TSN network, data are scheduled such that time-critical traffic needs to be delivered on time. The time-critical TSN traffic are typically periodic and different TSN traffic can have different periods. For a TSN traffic, the amount of data produced in each period is same. IEEE 802.1Q standard series are designed to schedule traffic in Ethernet based TSN networks. By defining up to eight queues based on traffic priority, TSN tries to ensure a bounded maximum latency for scheduled time-critical traffic through switched networks.

From the protocol stack perspective, TSN is the link layer technology. The forwarding decisions made by the TSN bridges/switches use the Ethernet header contents, not the IP address. The payloads of the Ethernet frames can be anything and are not limited to Internet Protocol. This means that TSN can be used in any environment and can carry the payload of any industrial application. At the link layer, the data unit is commonly referred to as frame instead of packet, which is a network layer term.

The TSN network supports applications that cannot be supported by conventional network. For scheduling, there are differences between conventional scheduling and TSN scheduling. The first difference is that conventional scheduling is frame based, i.e., scheduling schedules transmission of individual frame. On the other hand, TSN scheduling is stream based, i.e., scheduling schedules transmission of data stream. A stream consists of multiple frames. There needs to be a guard time gap between transmissions of two consecutive frames, i.e., two frames cannot be continuously transmitted one after another. The second difference is the end-to-end (E2E) latency computation. For the conventional scheduling, the E2E latency consists of queueing time and frame transmission time. However, for TSN scheduling, the E2E latency needs to consider queueing time, frame transmission time and guard time. The guard time depends on the number of frames in a TSN stream and the link connectivity. Therefore, conventional frame-based scheduling methods cannot be applied directly to the TSN stream scheduling.

However, Ethernet based TSN technology does not satisfy requirements of many industrial applications that require mobile nodes. Many technical issues need to be addressed.

Firstly, the Ethernet based TSN alone cannot satisfy requirements of many applications. For example, mobile robot and automated guided vehicle (AGV) are wildly used in the environments such as manufacturing and logistics warehouse. It is impractical to connect Ethernet cable to these types of mobile devices. On the other hand, the wireless TSN network can support applications that cannot be supported by the standard Ethernet based TSN network. Therefore, wireless nodes are inevitable components of the TSN networks. As a result, the TSN networks that consist of wireless nodes need to be provided.

For scheduling, there are differences between Ethernet based TSN scheduling and wireless TSN scheduling. The first difference is the link interference. There is no link interference between two Ethernet links because they are connected by two separate Ethernet cables. As a result, two Ethernet links can transmit simultaneously. On the other hand, there is link interference between two wireless links as long as they are close to each other. As a result, two interfering wireless links cannot transmit simultaneously. The second difference is that the Ethernet transmission is fast and reliable. In contrast, wireless transmission is slow and unreliable.

Secondly, the IEEE 802.1Qbv standard specifies the gate control list (GCL)-based scheduling for the Ethernet based TSN, in which scheduling is local to the egress port, i.e., each egress port has a scheduler to schedule traffic resides in the schedule queue. However, the problem is that the E2E latency is application layer requirement. A local scheduler at the Ethernet egress port is a link layer scheduler that is unable to know and support the application layer E2E latency.

Thirdly, the TSN standards are the link layer technologies. However, data traffic are generated at the application layer. As a result, traffic is queued at the higher layers. The link layer technology is not able to know the queueing time at the higher layers, so that it cannot compute the queueing delay at upper layers. In fact, 802.1Q specifies eight priority levels for the data traffic in the TSN network. However, priority does not contain timing information. Therefore, timing information is missing for the link layer technology to guarantee the E2E latency requirement.

Fourthly, IEEE 802.1Qbv specifies that each queue is associated with a gate, which can be either open or close. The gate status is controlled by the gate control list. However, 802.1Qbv does not provided the method to create the gate control list.

Fifthly, the wireless links add further challenge to a local scheduler. In fact, a link layer scheduler does not know which wireless links interfere with each other. Therefore, the local scheduling specified in IEEE 802.1Qbv is impractical for TSN, especially for wireless TSN.

To that end, a TSN scheduler needs to consider the upper layer queueing delay to compute the end-to-end application latency and consider interfering links such that any two interfering wireless links cannot be scheduled to transmit at the same time.

Accordingly, it is desirable to provide a scheduling method to schedule data traffic in TSN networks consisting of wireless nodes to satisfy the needs of TSN applications that requires mobile devices.

SUMMARY

The present disclosure relates generally to schedule data traffic in communications networks, and more particularly to methods and apparatus for scheduling data traffic in time sensitive networks consisting of wired and wireless nodes.

Some embodiments of the present disclosure provide a method for scheduling time-critical traffic streams in wireless time sensitive networks by jointly considering the end-to-end latency requirements and interfering links in wireless access networks. Additionally or alternatively, some embodiments optimize scheduling efficiency, so that the non-time-critical best effort traffic can be delivered as much as possible.

To that end, some embodiments are based on the recognition that the data traffic in a TSN network can be divided into the time-critical TSN traffic and the non-time-critical best effort traffic. The TSN traffic needs to meet the end-to-end application layer latency requirement.

Some embodiments of the present disclosure are based on the recognition that data traffic are produced by applications at the application layer and therefore, the end-to-end latency is measured at the application layer by applications. At source nodes, data traffic are queued at upper layer queues before they reach to the link layer, where the time sensitive networking (TSN) functions operate. Therefore, to satisfy the end-to-end latency requirement at application layer, the upper layer queueing delay needs to be considered.

To that end, some embodiments divide the end-to-end latency into two parts: the upper layer queueing delay and the TSN delay. The upper layer delay is measured at the data traffic source node and is the time difference from data traffic produced to the time data traffic reaches the link layer, i.e., the TSN layer. The TSN delay is the time difference from data traffic reaches the link layer at the source node to the time data traffic reaches the link layer of the destination node, where data traffic can be forwarded up to application without delay.

Wherein the scheduler in a TSN network that is a centralized scheduler that communicates with all end nodes for the upper layer queueing delay and transmits the schedules to all nodes.

Some embodiments of the present disclosure are based on the recognition that the TSN traffic is delivered in the form of the data stream. A stream is a unidirectional flow of data from a source node (talker) to one or more destination nodes (listeners). A TSN stream consists of one or more data frames. These data frames cannot be transmitted continuously over a link. There needs to be a guard time gap between two consecutive frame transmissions.

Some embodiments of the present disclosure are based on realization that the TSN delay of a TSN stream at a node (source node or relay node) without performing a random backoff, e.g., Ethernet node and wireless node using TDMA channel access, includes queueing time, total transmission time, total guard time and propagation time. For a wireless node using CSMA channel access, there is an additional delay, i.e., random backoff time. Therefore, the summation of delay at all the nodes along a routing path is the end-to-end TSN delay.

Some embodiments are based on the recognition that a schedule for a TSN stream is a transmission window in the form of [Node ID, Queue ID, Time Offset, Transmission Duration], wherein Node ID identifies a specific node; Queue ID identifies the queue whose data stream is scheduled to be transmitted; Time Offset indicates transmission starting time with respect to the start of the scheduling period; and Transmission Duration indicates total time needed to transmit the stream, wherein the transmission duration includes total transmission time, total guard time and propagation time.

Wherein, any two interfering wireless links in a TSN network cannot have an overlapping transmission window.

Further, a TSN scheduler needs to determine interfering wireless links. Two wireless links A→B and C→D are interfering links only if node C is in the neighborhood of node B and/or node A is in the neighborhood of node D.

Some embodiments are based on the recognition that different TSN streams in a TSN network may have different data generation periods. The streams with shorter periods require more frequent scheduling and the streams with longer periods require less frequent scheduling.

Also, that it is desirable for a TSN scheduler to have a scheduling period that is a multiple of all stream periods, e.g., the least common multiple (LCM). In each scheduling period, a TSN stream is scheduled one or more transmission windows.

Accordingly, a TSN scheduler needs to determine offsets of the streams within a scheduling period. Some embodiments form the scheduling problem for the TSN networks consisting of wireless nodes into a mixed integer linear programming (MILP) problem with following constraints:

Stream constraint: the scheduled time offsets need to be greater than or equal to zero, each transmission window needs to fit inside of the stream period and all transmission windows needs to fit inside of the scheduling period.

Link constraint: the streams scheduled on a link cannot have overlapping transmission windows in the time domain.

Wireless interfering link constraint: the streams scheduled on interfering wireless links cannot have overlapping transmission windows in the time domain.

Stream transmission constraint: each stream is scheduled to transmit successively along a determined routing path.

End-to-end constraint: the upper delay with the TSN delay need to be less than the required end-to-end latency required by application.

Some embodiments of the present disclosure are based on the recognition that an Ethernet TSN node can have multiple egress ports, each of which can have up to eight queues, and a wireless TSN node can have up to eight queues. Based on the number of queues, a TSN node can categorize traffic into traffic classes based on traffic priorities, and map traffic classes into the queues in such a way that the time-critical TSN traffic streams are mapped into the higher priority queues and the non-time-critical best effort traffic are mapped into the lower priority queues. Such that, some embodiments are based on the recognition that the centralized scheduler transmits the schedules to all the TSN nodes.

A TSN node can convert the transmission windows into gate control list events such that for each traffic stream in a queue, the starting time of the transmission window indicates the gate open time of the queue and the ending time of the transmission window indicates gate close time of the queue.

Practical Applications

The methods of the present disclosure can overcome many of the conventional problems, by including wireless devices in the time sensitive networks. Latency refers to speed of network traffic, which is measured in milliseconds or microseconds, with higher numbers indicating slower connections. What constitutes an acceptable latency range will vary not only network by network, but also application by application. Devices and applications needing more network bandwidth, such as video or VoIP calls, will require lower latency ranges to function properly and efficiently. Industrial control commands and responses require even lower latency ranges. Latency is measured in milliseconds or microseconds, and it can indicate one of two things depending on the metric used. The more common way of measuring latency is called "round-trip time" (or RTT), which calculates the time it takes for a data packet to travel from one point to another on the network and for a response to be sent back to the source. The other measurement is called "time to first byte" (or TTFB), which records the time it takes from the moment a packet leaves a point on the network to arrive at its destination. RTT is more commonly used to measure latency, because it can be run from a single point on the network and does not require data collection software to be installed on the destination point (as TTFB does). However, in the time sensitive networks, TTFB is commonly used to measure the latency.

Some embodiments of the present disclosure provide methods and systems that include a TSN scheduler that considers an upper layer queueing delay to compute the end-to-end application latency, as well as jointly considers interfering links, such that any two interfering wireless links cannot be scheduled to transmit at the same time. Further, some embodiments of the present disclosure also provide for a scheduling method to schedule data traffic in TSN networks consisting of wireless nodes to satisfy the needs of TSN applications that requires mobile devices.

As noted above, the TSN network supports applications that cannot be supported by conventional network. For scheduling, there are differences between conventional scheduling and TSN scheduling. The first difference is that conventional scheduling is frame based, i.e., scheduling schedules transmission of individual frame. On the other hand, TSN scheduling is stream based, i.e., scheduling schedules transmission of data stream. A stream consists of multiple frames. There needs to be a guard time gap between transmissions of two consecutive frames, i.e., two frames cannot be continuously transmitted one after another. The second difference is the end-to-end (E2E) latency computation. For the conventional scheduling, the E2E latency consists of queueing time and frame transmission time. However, for TSN scheduling, the E2E latency needs to consider queueing time, frame transmission time and guard time. The guard time depends on the number of frames in a TSN stream and the link connectivity. Therefore, conventional frame-based scheduling methods cannot be applied directly to the TSN stream scheduling. The methods of the present disclosure provide for scheduling methods that can be applied directly to the TSN stream scheduling. Some advantages and benefits of these features are that the network capacity can be increased, resulting in addressing the today's increasing demands for faster networking speeds.

For example, VOIP solutions and video chat apps are part of today's business and our personal lives, along with online multiplayer games that have become mainstream hobbies. To enable these applications, huge volumes of data are being exchanged online at ever-more-massive rates. A delay in the transmission of data—i.e. latency—can have an enormous impact on user experience. The methods and systems of the present disclosure can provide the capacity required to meet the demanding network capacity requirements of today's business and consumers.

According to an embodiment of the present disclosure, a system for scheduling data traffic in a wireless time sensitive network (TSN) having nodes that are wired nodes and wireless nodes. The system including a computer in communication with a memory. The computer is configured to synchronize clocks of all nodes with a common clock in the TSN. Then, a network scheduler communicates with a set of nodes to deliver data traffic to the TSN, such that the data traffic is prioritized as TSN data streams classified as time critical data traffic and non-time critical data traffic. Determine link layer routing paths using the data traffic and stored routing protocol data. Compute for each link layer routing path, a link communication delay for each link of one or more relay nodes connecting a source node to a destination node for each TSN stream using a network scheduler. Wherein the link communication delay includes a transmission duration that is a portion of a link delay. The transmission duration includes a total transmission time, a total guard time, and the link delay includes a queueing delay. Determine interfering links for each wireless link using the network scheduler, so that the interfering links do not have an overlapping transmission time. Then, determine a scheduling period using the network scheduler, so that each TSN stream is transmitted at least once in a scheduling period. Determine optimal scheduling using an optimal scheduling module, so as to generate a gate control list for each egress port of the wired node and a wireless transmitter of the TSN. Then, generate the gate control list for each egress port of the wired node and the wireless transmitter of the TSN. Begin transmission of the data based on the generated gate control list.

Another embodiment of the present disclosure, a method for scheduling data traffic in a wireless time sensitive network (TSN). The method including synchronizing clocks of all nodes with a common clock in the TSN. Then, a network scheduler communicates with a set of nodes to deliver data traffic to the TSN. Such that the data traffic is prioritized as TSN data streams classified as time critical data traffic and non-time critical data traffic. Determining link layer routing paths using the data traffic and stored routing protocol data. Compute for each link layer routing path, a link communication delay for each link of one or more relay nodes connecting a source node to a destination node for each TSN stream using a network scheduler. Wherein the link communication delay includes a transmission duration that is a portion of a link delay. The transmission duration includes a total transmission time to transmit all frames in the TSN stream and a total inter-frame-guard-time, and the link delay includes a queueing delay. Determining interfering links for each wireless link using the network scheduler, so that the interfering links do not have an overlapping transmission time. Then, determining a scheduling period using the network scheduler, so that each TSN stream is transmitted at least once in a scheduling period. Followed by determining optimal scheduling using an optimal scheduling module, so as to generate a gate control list for each egress port of the wired node and a wireless transmitter of the TSN. Generating the gate control list for each egress port of the wired node and the wireless transmitter of the TSN. Staring transmission of the data based on the generated gate control list.

Another embodiment of the present disclosure, a system for scheduling data traffic in a wireless time sensitive network (TSN) having nodes that are wired nodes and wireless nodes. The system including a computer in communication with a memory. The computer is configured to synchronize clocks of all nodes with a common clock in the TSN, Then, a network scheduler communicates with a set of nodes to deliver data traffic to the TSN. Such that the data traffic is prioritized as TSN data streams classified as time critical data traffic and non-time critical data traffic. Determine link layer routing paths using the data traffic and stored routing protocol data. Then, compute for each link layer routing path, a link communication delay for each link of one or more relay nodes connecting a source node to a destination node for each TSN stream using a network scheduler. Determine interfering links for each wireless link using the network scheduler, so that the interfering links do not have an overlapping transmission time. Then, determine a scheduling period based on equation (3) using the network scheduler, so that each TSN stream is transmitted at least once in a scheduling period. Determine optimal scheduling using an optimal scheduling module shown in equation (4), so as to generate a gate control list for each egress port of the wired node and a wireless transmitter of the TSN. Then, generate the gate control list for each egress port of the wired node and the wireless transmitter of the TSN. Begin transmission of the data based on the generated gate control list.

Another embodiment of the present disclosure, a system for scheduling data traffic in a wireless time sensitive network (TSN). The system including a computer in communication with a memory. The computer is configured to synchronize clocks of all nodes with a common clock in the TSN. Wherein the nodes include end nodes and relay nodes, the end nodes include wired and wireless data source and destination nodes, and relay nodes include wired and wireless bridges/switches/routers/access points. Obtain data traffic information using a network scheduler for the TSN to establish routing paths, by communicating with the wired and wireless end nodes for TSN data traffic. Such that the TSN data traffic includes TSN data streams and the best effort data traffic. Wherein the TSN data stream is time prioritized into time critical data traffic and the best effort traffic data is classified as non-time critical data. Determine routing paths using the obtained data traffic information and stored routing information via the memory. Such that each routing path begins from a source node and ends at a destination node, along with one or more relay nodes connecting the source node to the destination node. Compute a link communication delay for each link of the one or more relay nodes connecting the source node to the destination node for each TSN stream using a network scheduler. Wherein the link communication delay includes a transmission duration that is a portion of a link delay that includes a queueing delay. Such that the queueing delay is determined by an optimal scheduling module, wherein transmission duration includes a total time to transmit all frames in the TSN stream and a total inter-frame-guard-time. Determine interfering links for each wireless link using the network scheduler, so that the interfering links do not have an overlapping transmission time. Determining a scheduling period based on equation (3) using the network scheduler, so that each TSN stream is transmitted at least once in a scheduling period. Determine optimal scheduling using an optimal scheduling module based on equation (4). Wherein a schedule for a TSN stream is a transmission window in a form of a Node ID, a Queue ID, a Time Offset and a Transmission Duration, wherein for a queue identified by the Queue ID of a node identified by the Node ID. The Time Offset corresponds to a gate open time, and the Time Offset plus the Transmission Duration corresponds to a gate close time, so as to generate a gate control list for each egress port of the wired node and a wireless transmitter of the TSN. Generate the gate control list for each egress port of the wired node and the wireless transmitter of the TSN. Begin transmission of the data based on the generated gate control list.

Another embodiment of the present disclosure, a non-transitory computer readable storage medium embodied thereon a program executable by a computer for performing a method. The method for scheduling data traffic in a wireless time sensitive network (TSN). The method including synchronizing clocks of all nodes with a common clock in the TSN. Wherein the nodes include end nodes and relay nodes, the end nodes include wired and wireless data source and destination nodes, and relay nodes include wired and wireless bridges/switches/routers/access points. Obtaining data traffic information using a network scheduler for the TSN to establish routing paths, by communicating with the wired and wireless end nodes for TSN data traffic. Such that the TSN data traffic includes TSN data streams and best effort data traffic. Wherein the TSN data stream is time prioritized into time critical data traffic and the best effort traffic data is classified as non-time critical data. Determining routing paths using the obtained data traffic information and stored routing information via the memory. Such that each routing path begins from a source node and ends at a destination node, along with one or more relay nodes connecting the source node to the destination node. Computing a link communication delay for each link of the one or more relay nodes connecting the source node to the destination node for each TSN stream using a network scheduler. Wherein the link communication delay includes a transmission duration that is a portion of a link delay that includes a queueing delay. Such that the queueing delay is determined by an optimal scheduling module. Wherein transmission duration includes a total time to transmit all frames in the TSN stream and a total inter-frame-guard-time. Determining interfering links for each wireless link using the network scheduler, so that the interfering links do not have an overlapping transmission time. Determining a scheduling period shown in equation (3) using the network scheduler, so that each TSN stream is transmitted at least once in a scheduling period. Determining optimal scheduling using an optimal scheduling module shown in equation (4). Wherein a schedule for a TSN stream is a transmission window in a form of a Node ID, a Queue ID, a Time Offset and a Transmission Duration. Wherein for a queue identified by the Queue ID of a node identified by the Node ID, the Time Offset corresponds to a gate open time, and the Time Offset plus the Transmission Duration corresponds to a gate close time, so as to generate a gate control list for each egress port of the wired node and a wireless transmitter of the TSN. Generating the gate control list for each egress port of the wired node and the wireless transmitter of the TSN. Staring transmission of the data based on the generated gate control list.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 9A is a schematic illustrating an example of scheduling a node that has multiple TSN streams stored in different priority queues, according to some embodiments of the present disclosure;

FIG. 9B is a schematic illustrating an example of converting the schedule shown in FIG. 9A into the gate control list to control data traffic transmission by the TSN node, according to some embodiments of the present disclosure;

While the above-identified drawings set forth presently disclosed embodiments, other embodiments are also contemplated, as noted in the discussion. This disclosure presents illustrative embodiments by way of representation and not limitation. Those skilled in the art can devise numerous other modifications and embodiments, which fall within the scope and spirit of the principles of the presently disclosed embodiments.

DETAILED DESCRIPTION

Figure 1A:
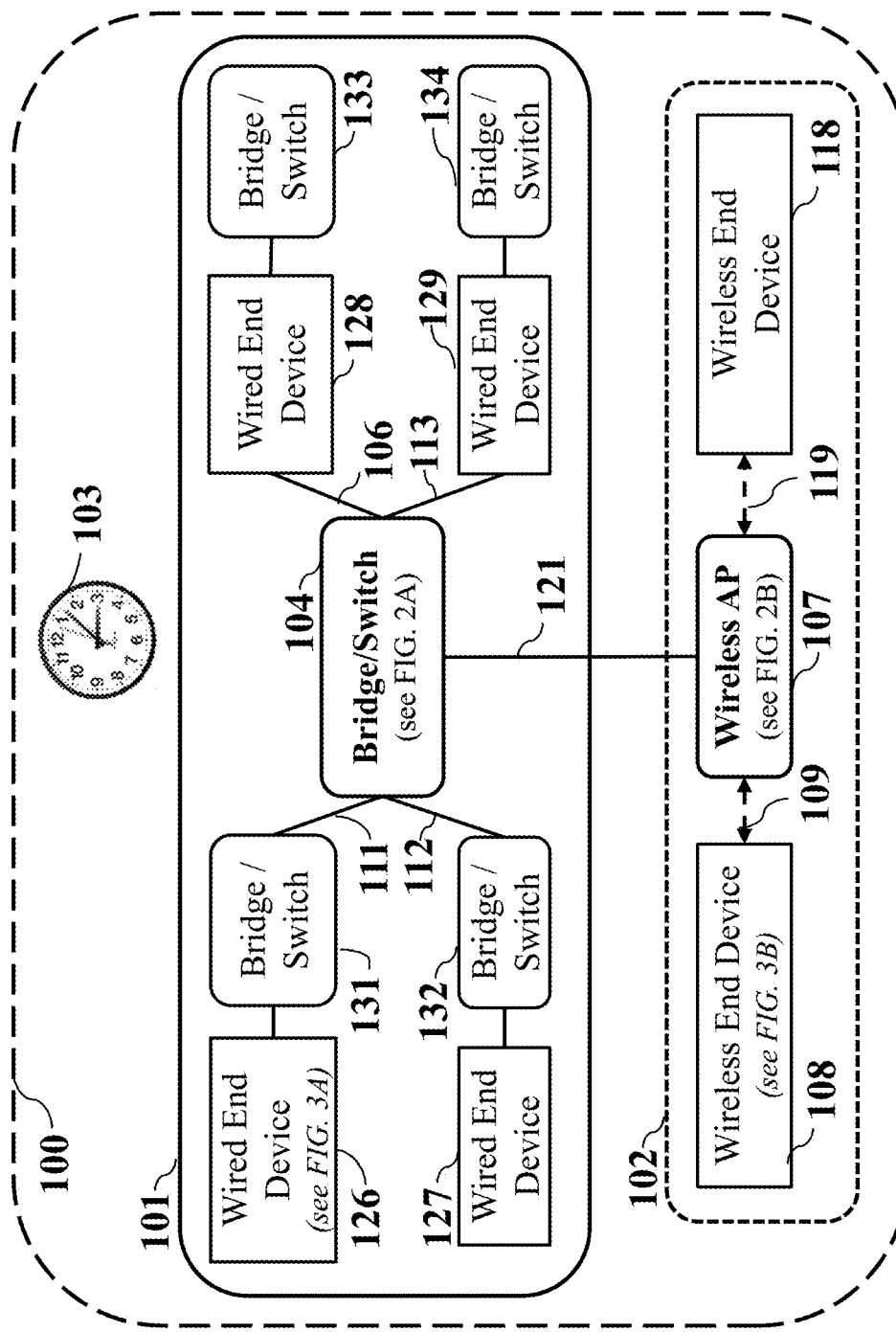
FIG. 1A is a schematic illustrating a time sensitive network that consists of both wired end nodes, wired relay nodes, wireless relay nodes, wireless end nodes and a common clock to all the nodes, according to an embodiment of the present disclosure.

FIG. 1A—is a schematic illustrating a time sensitive network that consists of both wired end nodes, wired relay nodes, wireless relay nodes, wireless end nodes and a common clock to all the nodes, according to an embodiment of the present disclosure. Initially, to provide some information about the TSN network, the TSN network has two classes of nodes, i.e., an end node and a relay node. The end nodes represent devices that are data traffic sources and/or data traffic destinations. The data traffic source node can be referred to as the talker and the data traffic destination node can be referred to as the listener. The end nodes can perform separate functions according to protocol stack layers. However, end nodes do not relay data. The relay nodes represent network bridges and switches as well as wireless access point. They work at the link layer to form a network and route data traffic from the source to destination.

FIG. 1A shows a wireless time sensitive network 100 that consists of a wired TSN portion 101, a wireless TSN portion 102 and a common clock 103. The wired TSN portion 101 includes a wired relay node 104, wired end nodes 126, 127, 128, 129 linked with bridge/switches 131, 132, 133, 134 and wired links 106, 111, 112, 113. The wireless TSN portion 102 includes a wireless relay node 107, wireless end nodes 108, 118 and wireless lines 109, 119. The wired TSN portion 101 and the wireless TSN portion 102 are respectively connected by a wired relay node 104 and a wireless relay node 107, in which a wireless relay node 107 is connected to a wired relay node 104 via a wired link 121.

In the wireless TSN network 100, different nodes have different functional structures. Relay node and end node have different functional structures. Wired node and wireless node have different functional structures.

A wired relay node can have multiple ingress ports and multiple egress ports.

Figure 2A:
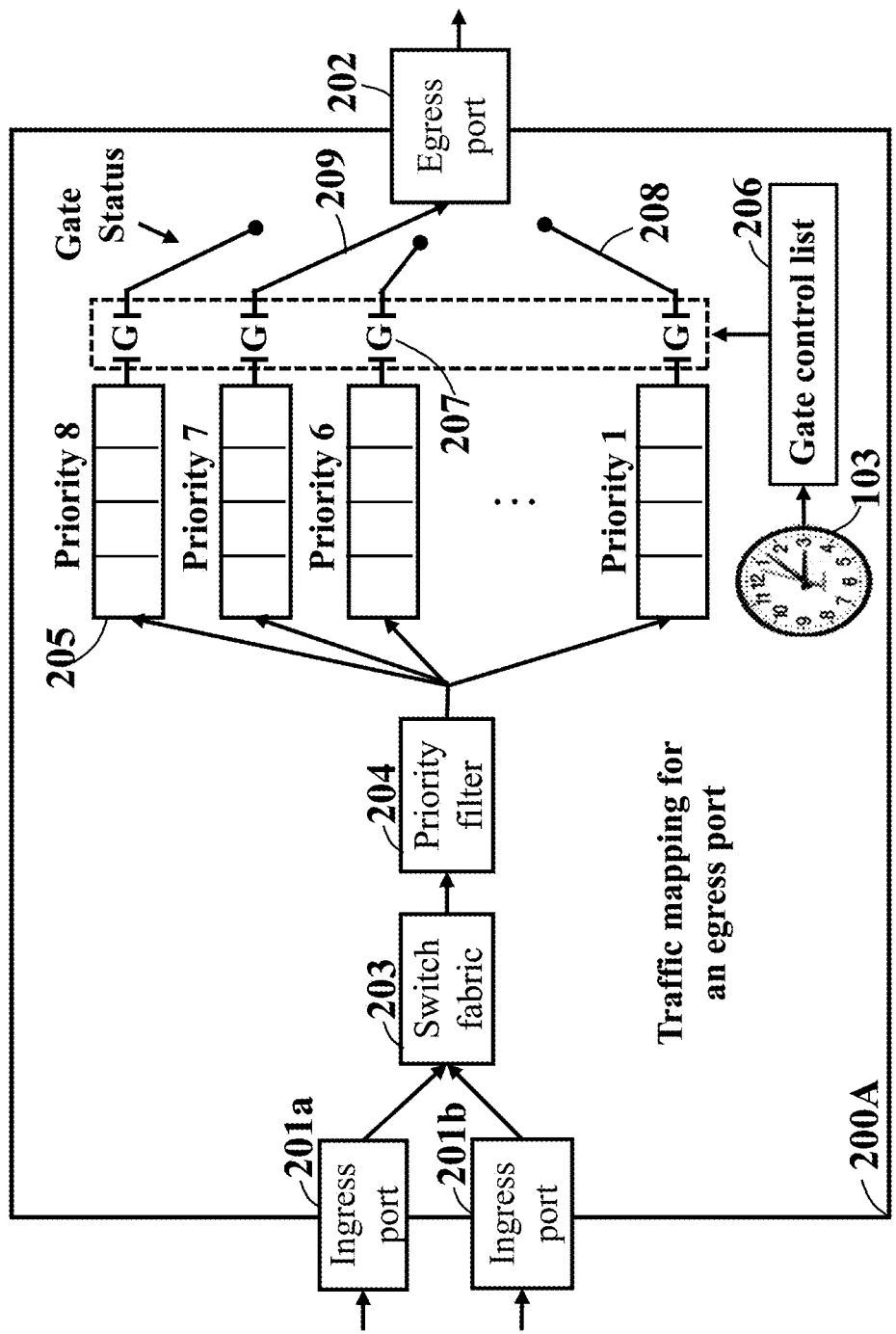
FIG. 2A is a schematic illustrating the functional structure of traffic map for an egress port at an 802.1Qbv capable wired relay node in a wireless time sensitive network, according to some embodiments of the present disclosure.

FIG. 2A is a schematic illustrating the functional structure of traffic map for an egress port at an 802.1Qbv capable wired relay node in a wireless time sensitive network, according to some embodiments of the present disclosure. For example, FIG. 2A shows the functional structure of traffic map for an egress port at the 802.1Qbv capable wired relay node 200A, which includes common clock 103, multiple ingress ports 201a, 201b, egress port 202, internal switch fabric 203, priority filter 204, a set of queues (up to eight) 205, gate control list 206, a set of gates G (equal to the number of queues) 207. The gate control list 206 controls gate status, i.e., open or close. Data can only be transmitted from gates G that are open. FIG. 2A shows the gate 208 closed and the gate 209 open. Therefore, data from gate 209 is being transmitted to egress port 202. Each queue also has a frame selection function. However, a wireless relay node has a different structure.

Figure 2B:
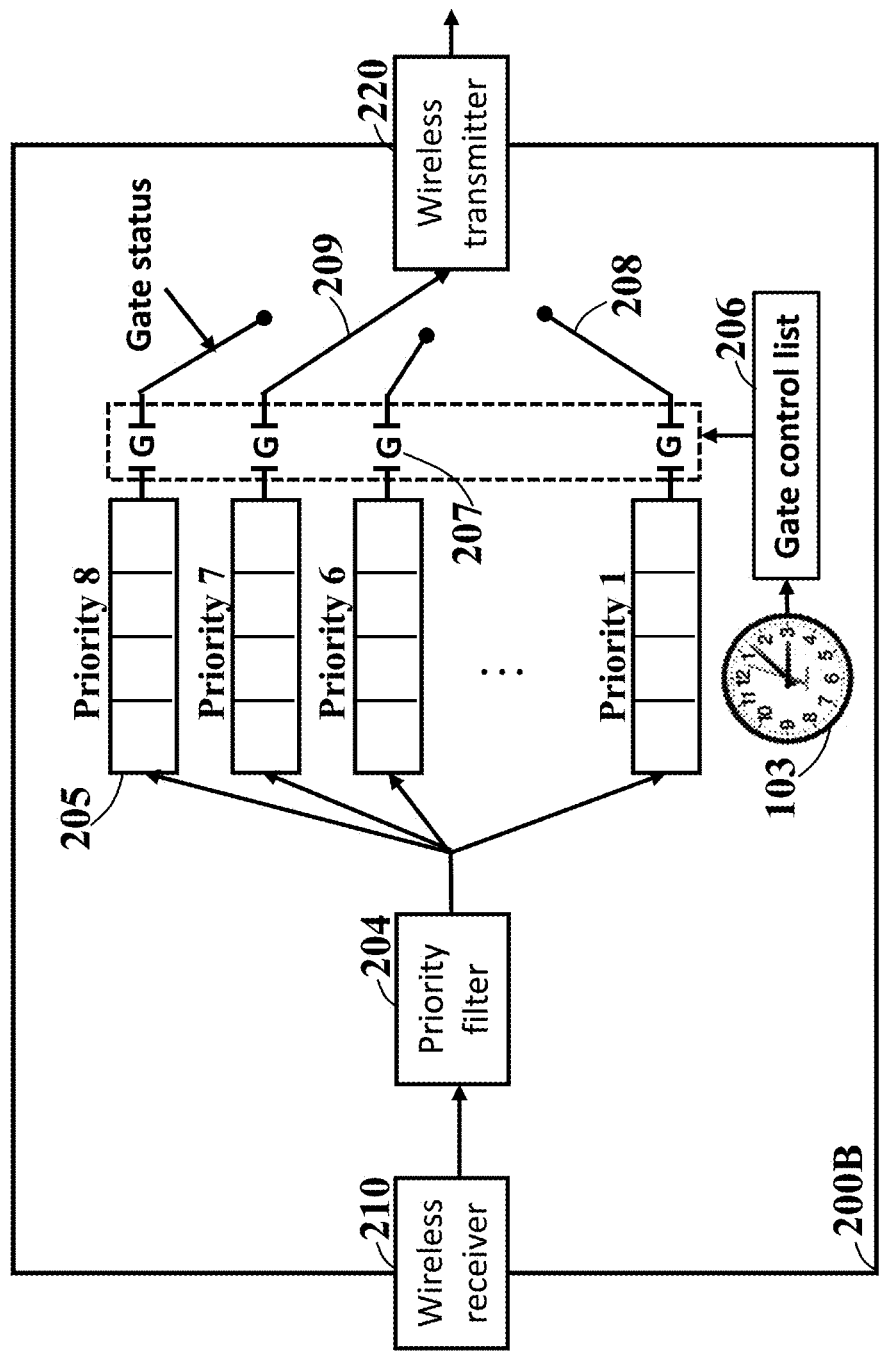
FIG. 2B is a schematic illustrating a functional structure of an 802.1Qbv capable wireless relay node in a wireless time sensitive network, according to some embodiments of the present disclosure.

FIG. 2B is a schematic illustrating a functional structure of an 802.1Qbv capable wireless relay node in a wireless time sensitive network, according to some embodiments of the present disclosure. For example, FIG. 2B shows the functional structure of the wireless 802.1Qbv capable relay node 200B in a wireless time sensitive network, which includes common clock 103, a wireless receiver 210, a wireless transmitter 220, priority filter 204, a set of queues (up to eight) 205, gate control list 206, a set of gates G (equal to the number of queues) 207. The gate control list 206 controls gate status, i.e., open or close. Data can only be transmitted from gates that are open. FIG. 2B shows gate 208 closed and gate 209 open. Therefore, data from gate 209 is being transmitted to wireless transmitter 220. Each queue also has a frame selection function.

Figure 3A:
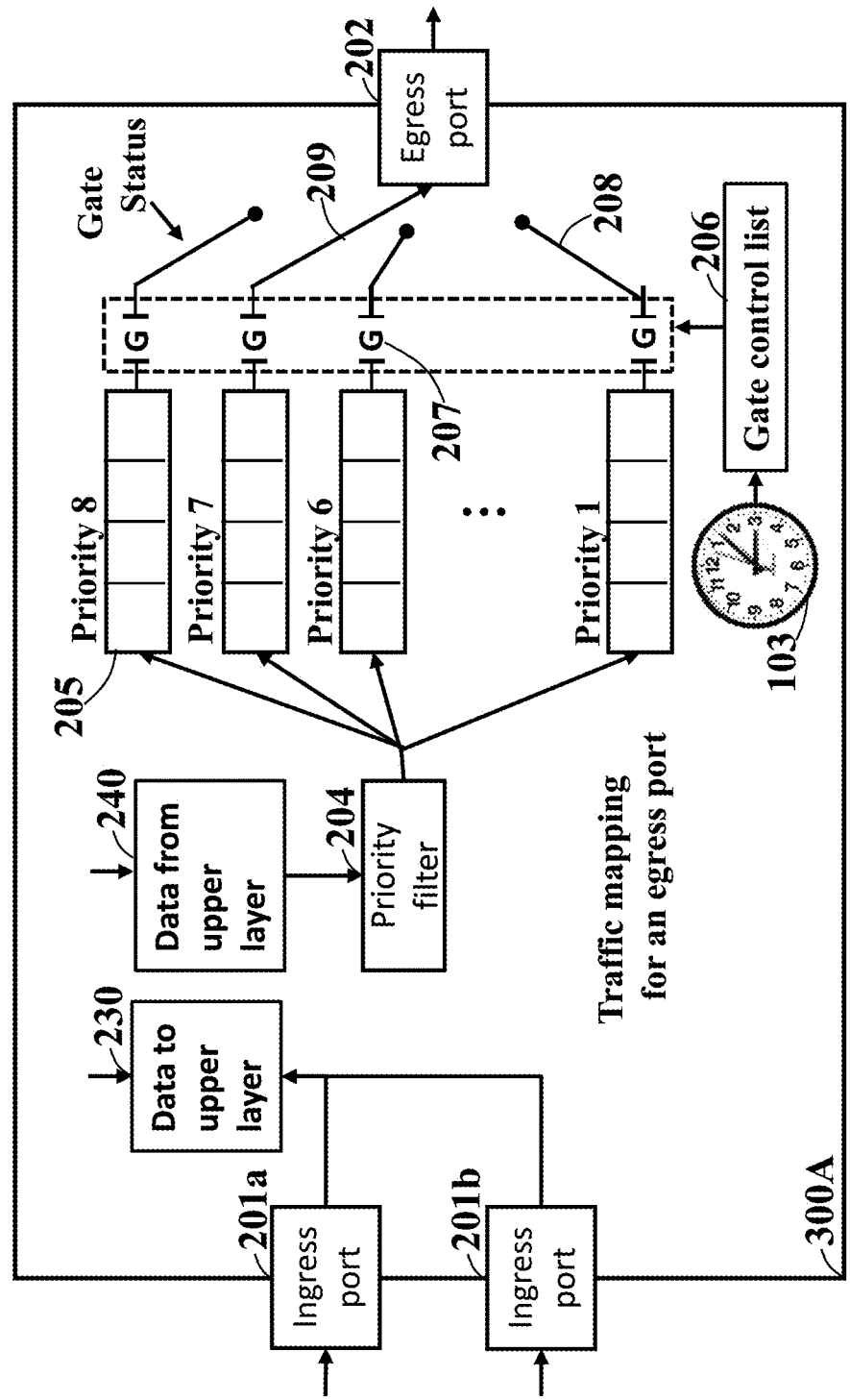
FIG. 3A is a schematic illustrating a functional structure of an 802.1Qbv capable wired end node in a time sensitive network, according to some embodiments of the present disclosure.

A wired end node can have multiple ingress ports and multiple egress ports. However, a wired end node does not relay data. FIG. 3A is a schematic illustrating a functional structure of an 802.1Qbv capable wired end node in a time sensitive network, according to some embodiments of the present disclosure. For example, FIG. 3A shows the functional structure of traffic map for an egress port at the 802.1Qbv capable wired end node 300A, which includes common clock 103, multiple ingress ports 201a, 201b, egress port 202, priority filter 204, a set of queues (up to eight) 205, gate control list 206, a set of gates G (equal to the number of queues) 207. The gate control list 206 controls gate status, i.e., open or close. Data can only be transmitted from gates that are open. FIG. 3A shows gate 208 closed and gate 209 open, so that data is transmitted from gate 209 to Egress port 202. Each queue also has a frame selection function. However, a wired end node does not need internal switch fabric 203 of FIG. 2A, because the received data is forwarded to upper layer 230 and outgoing data 240 from upper layers goes to priority filter 204. Similarly, a wireless end node does not relay data.

Figure 3B:
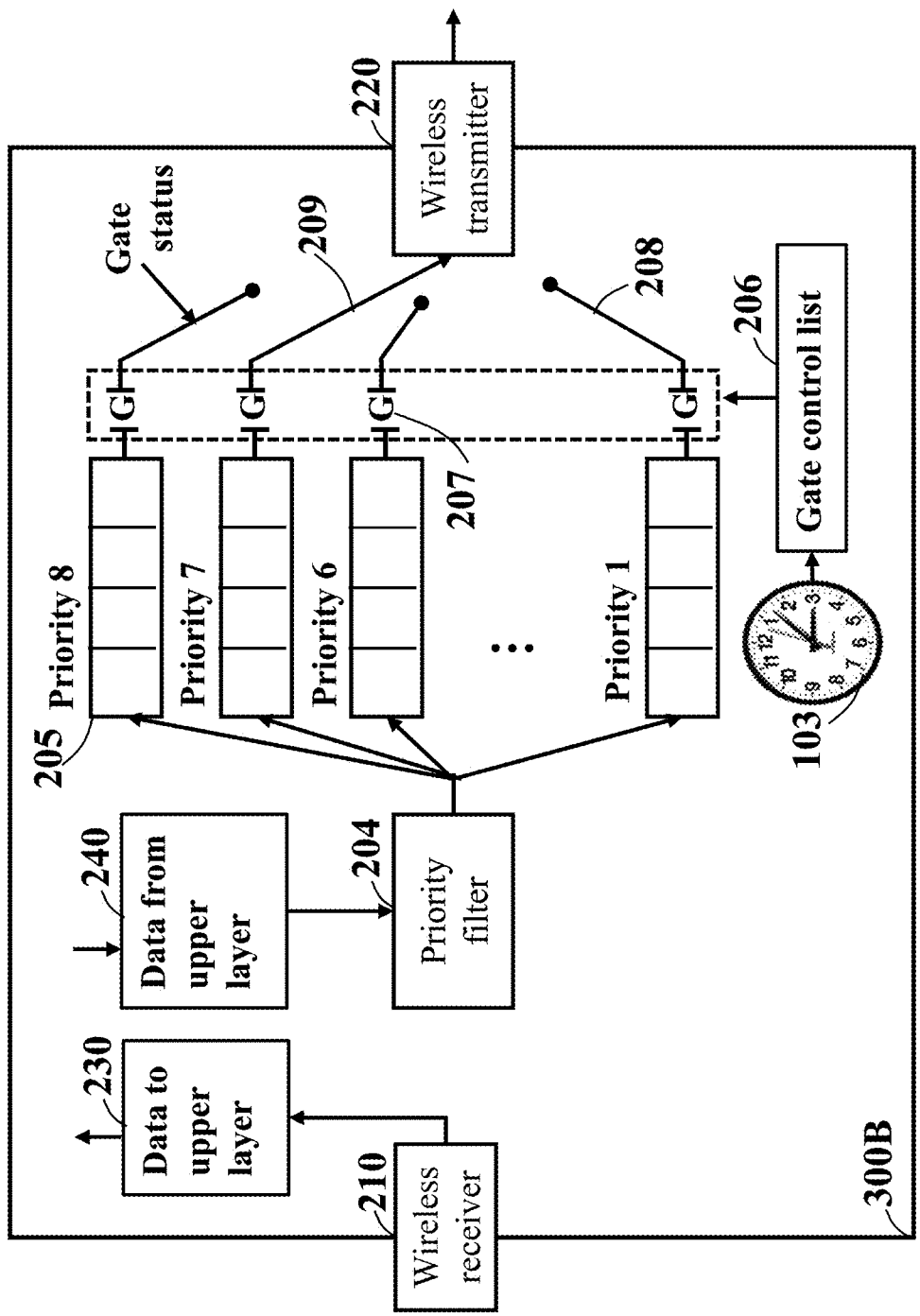
FIG. 3B is a schematic illustrating a functional structure of an 802.1Qbv capable wireless end node in a time sensitive network, according to some embodiments of the present disclosure.

FIG. 3B is a schematic illustrating a functional structure of an 802.1Qbv capable wireless end node in a time sensitive network, according to some embodiments of the present disclosure. For example, FIG. 3B shows the functional structure of the 802.1Qbv capable wireless end node 300B, which includes common clock 103, a wireless receiver 210, a wireless transmitter 220, priority filter 204, a set of queues (up to eight) 205, gate control list 206, a set of gates G (equal to the number of queues) 207. The gate control list controls gate status, i.e., open or close. Data can only be transmitted from gates that are open. FIG. 3B shows gate 208 closed and gate 209 open. Therefore, data from gate 209 is being transmitted to wireless transmitter 220. Each queue also has a frame selection function. A wireless end node does not need internal switch fabric 203 of FIG. 2A, because the received data is forwarded to upper layer 230 and outgoing data 240 from upper layers goes to priority filter 204.

End-To-End Delay Computation

Figures 4A, 4B:
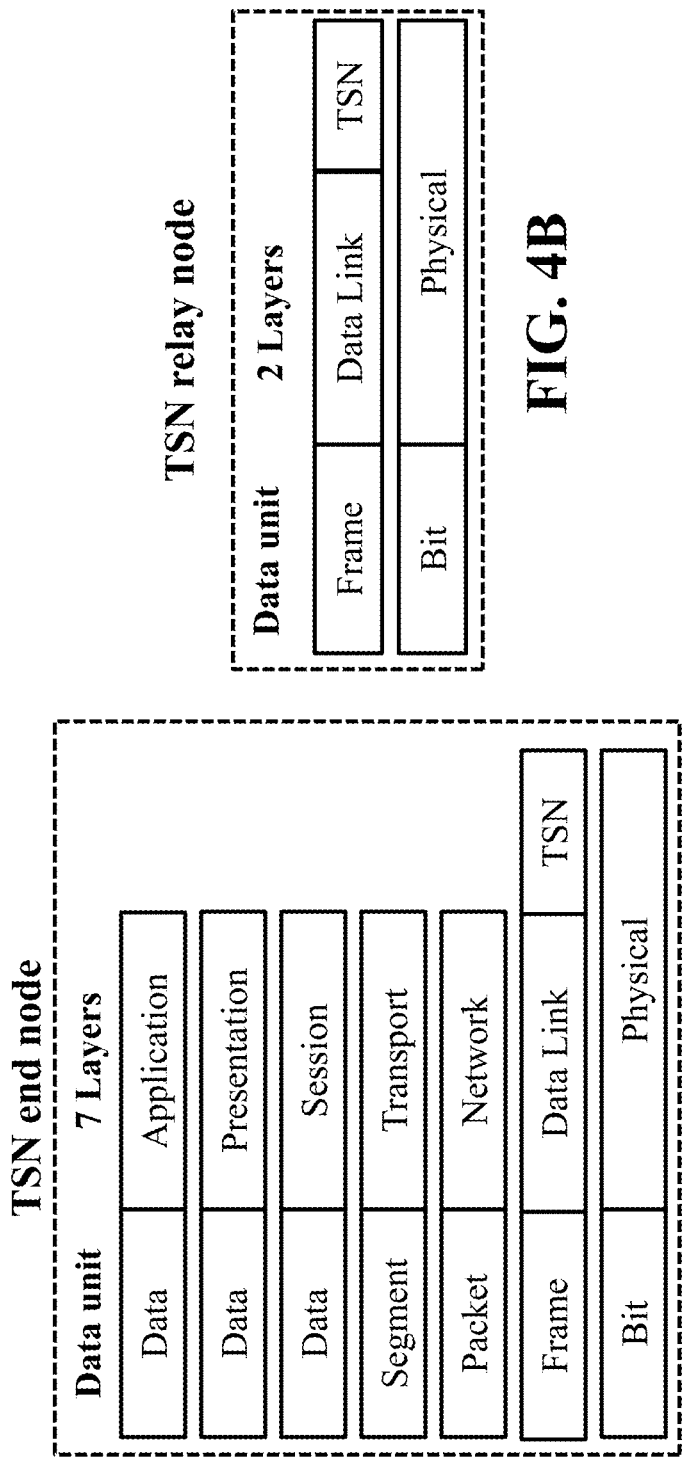
FIG. 4A is a schematic illustrating a protocol stack of a TSN end node, according to some embodiments of the present disclosure.
FIG. 4B is a schematic illustrating a protocol stack of a TSN relay node, according to some embodiments of the present disclosure.

FIG. 4A is a schematic illustrating a protocol stack of a TSN end node, according to some embodiments of the present disclosure.

FIG. 4B is a schematic illustrating a protocol stack of a TSN relay node, according to some embodiments of the present disclosure.

Referring to FIG. 4A and FIG. 4B, besides functional structure, an end node and relay node also can have different protocol stacks. The end node is an application node. Therefore, the end node can have seven protocol layers as shown in FIG. 4A. Especially, TSN operates at the link layer. On the other hand, a TSN relay node can have two layer protocol layers as shown in FIG. 4B. As the TSN end node, TSN operates at the link layer.

Figure 5:
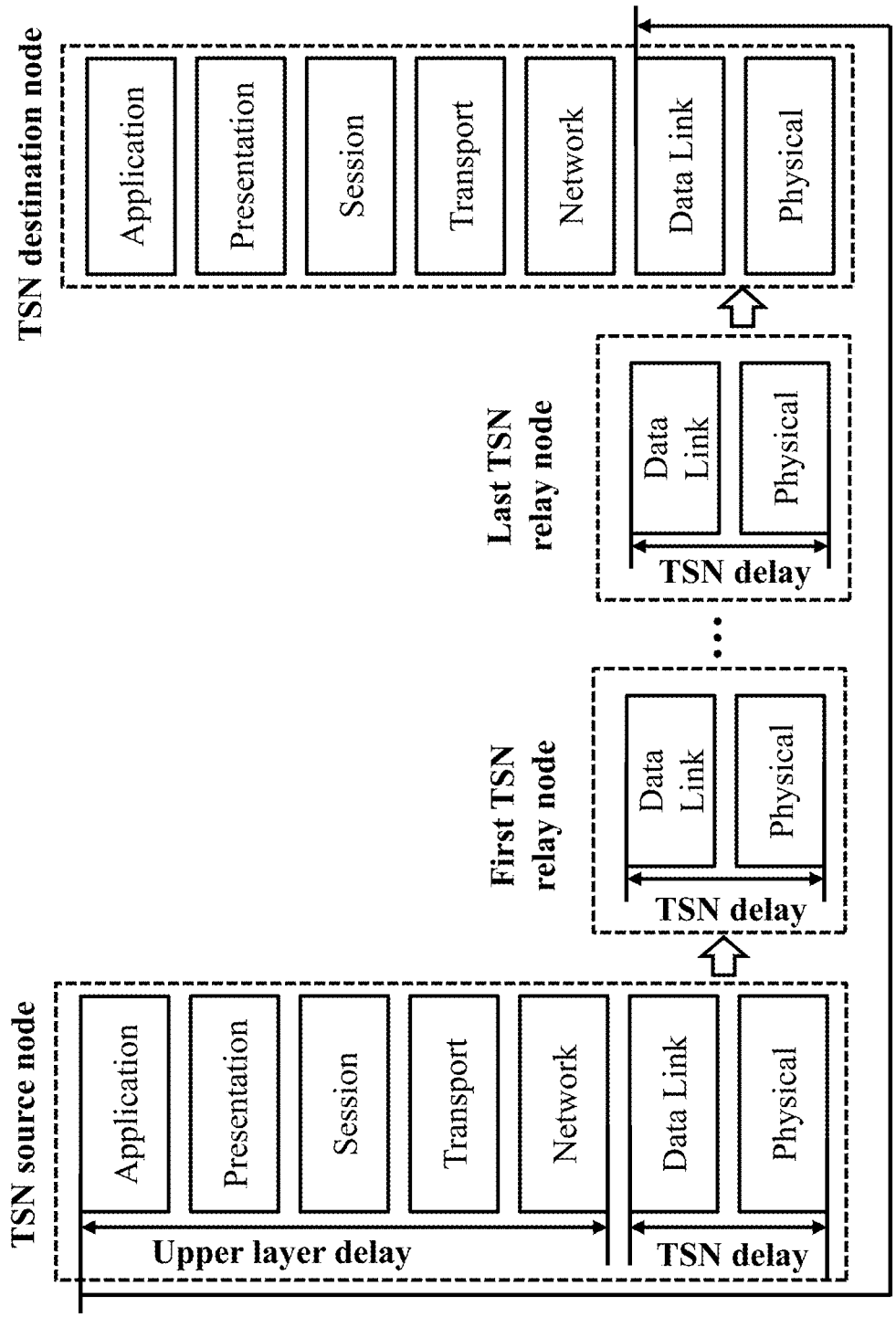
FIG. 5 is a schematic illustrating an end-to-end delay computation in a TSN network, according to some embodiments of the present disclosure.

FIG. 5 is a schematic illustrating an end-to-end delay computation in a TSN network, according to some embodiments of the present disclosure. For example, FIG. 5 shows the different protocol stacks result in the difference in end-to-end delay computation, which has not been correctly computed by the existing technology. FIG. 5 also shows that the end-to-end delay can be calculated as $$\text{E2E Delay} = \text{Upper Layer Delay} + \text{E2E TSN Delay}. \quad (1)$$

A TSN application node has to take the upper layer delay into account because data traffic are generated at the application layer. As a result, data traffic are queued at the higher layers before they reach to the link layer, i.e., TSN layer.

Unlike conventional frame or packet-based scheduling, TSN scheduling schedules the stream instead of individual frame or packet. A TSN stream is a unidirectional flow of data from a source node to one or more destination nodes. A TSN stream consists of multiple frames, which cannot be transmitted continuously. Thus, a guard time gap needs to be inserted between two consecutive frames. In addition, there needs to be a guard time gap between two consecutive streams.

Figure 6:
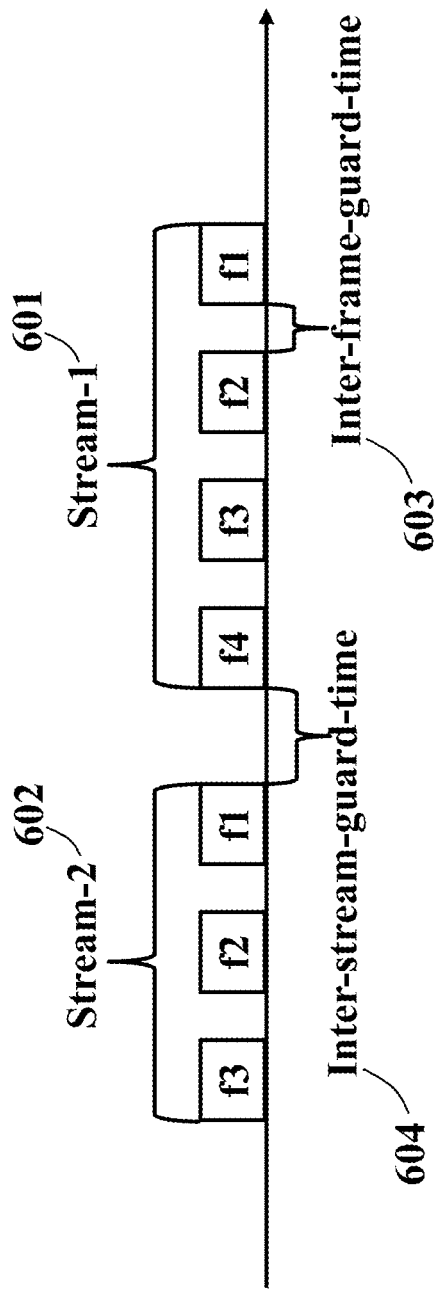
FIG. 6 is a schematic illustrating an example of inter-frame-guard-time and inter-stream-guard-time, according to some embodiments of the present disclosure.

FIG. 6 is a schematic illustrating an example of inter-frame-guard-time and inter-stream-guard-time, according to some embodiments of the present disclosure. For example, FIG. 6 shows an example of two different types of guard time for TSN stream transmissions, in which two TSN streams, Stream-1 601 and Stream-2 602. Stream-1 601 consists of four frames and Stream-2 consists of three frames. There is an inter-frame-guard-time 603 and inter-stream-guard-time 604.

For a TSN stream s, the delay at a relay node i is defined as $D_s^i$=TSN Queuing time+Optional Backoff time+Total TX time+Propagation time+Total guard time, where TSN Queuing time=Dequeue time of last frame−Enqueue time of first frame;

Backoff time applies only if CSMA channel access mechanism is used and it only applies to first frame, the rest of frames can be transmitted with fixed time gap such as shorter inter frame space (SIFS) in WiFi network;

$$TX \text{ time of a frame} = \frac{\text{Frame length}}{TX - \text{rate}},$$

Total TX time=TX time of all frames in a stream;

Propagation time is the time needed for a signal to travel from the sender to receiver. For Ethernet based TSN, the propagation time can be ignored. However, it may need to be considered for wireless TSN; and Guard interval is defined as the minimum time gap required between TXs of two consecutive frames. In Wi-Fi based TSN, SIFS can be used for two frames in same stream and DIFS can be as used for two frames in different streams. For Ethernet based TSN, it is defined as IFG (Inter Frame Gap) time=12 bytes/Port-TX-Rate in the worst-case scenario. Thus, the guard interval is equal to time required to transmit a maximum length frame.

Therefore, E2E TSN delay for a stream s is defined as the time difference from the time stream reaches link layer at the source node to the time stream is completely received at the destination node. For an N-hop routing path, it can be calculated as $$E2E \text{ TSN delay} = \sum_{i=0}^{N} D_s^i. \quad (2)$$

IEEE 802.1Qca specifies the path reservation protocol to configure the link layer routing path in the TSN network. A routing path starts from the source node and ends at the destination node, which are connected by one or more relay nodes. However, as the link layer devices, relay nodes do not produce data traffic and do not consume data traffic. Therefore, the relay node cannot be the source node or destination node.

TSN Stream Representation

A TSN stream is a periodic data flow from a source node to one or more destination nodes. Let S be the set of streams in a wireless TSN network. For a stream $s_i \in S$ from source node $v_a$ to destination node $v_b$, $s_i$ is represented as <$s_i$.E2E, $s_i$.L, $s_i$.F, $s_i$.G, $s_i$.T, $s_i$.P>, where $s_i$.E2E is the end-to-end delay requirement;
$s_i$.L is the total number of bits in the stream;
$s_i$.F is the number of frames in the stream;
$s_i$.G is the inter frame guard time for consecutive transmission of frames, e.g., SIFS in the WiFi based TSN;
$s_i$.T is the time length of the stream period; and
$s_i$.P is the routing path of the stream with source node $v_a$ and destination node $v_b$, represented as
([$v_a$, $v_{a+1}$], . . . , [$v_x$, $v_y$], . . . , [$v_{b-1}$, $v_b$]).

For a routing path
([$v_a$, $v_{a+1}$], . . . , [$v_x$, $v_y$], . . . , [$v_{b-1}$, $v_b$]),
a link [$v_x$, $v_y$] on the path is represented as
<[$v_x$, $v_y$].r, [$v_x$, $v_y$].pd, [$v_x$, $v_y$].mt, [$v_x$, $v_y$].g>,
where
[$v_x$, $v_y$].r is the transmission (TX) data rate on the link;
[$v_x$, $v_y$].pd is the propagation delay;
[$v_x$, $v_y$].mt is the microtick of the link, defining the fine scaled time interval; and
[$v_x$, $v_y$].g is the length of inter stream guard time between two consecutive streams, e.g., DIFS time in the WiFi based TSN.

Interfering Links in Wireless TSN

In the Ethernet based TSN, any two links can simultaneously transmit because they are connected by different Ethernet cables and do not interfere with each other. However, a wireless network is a shared medium network, so that two close wireless links can interfere with each other. A scheduler needs to determine interfering links. A local scheduler provided in 802.1Q and 802.1Qbv is not able to determine the interfering wireless links because the local scheduler does not have network topology information.

Let $N_{vx}$ denote neighbors of node $v_x$, i.e., the set of nodes that can communicate with node $v_x$. Two wireless links [$v_a$, $v_b$] and [$v_c$, $v_d$] are interfering links if
1) $v_c \in N_{vb}$ or
2) $v_a \in N_{vd}$ or
3) $v_c \in N_{vb}$ and $v_a \in N_{vd}$.

Figure 7A:
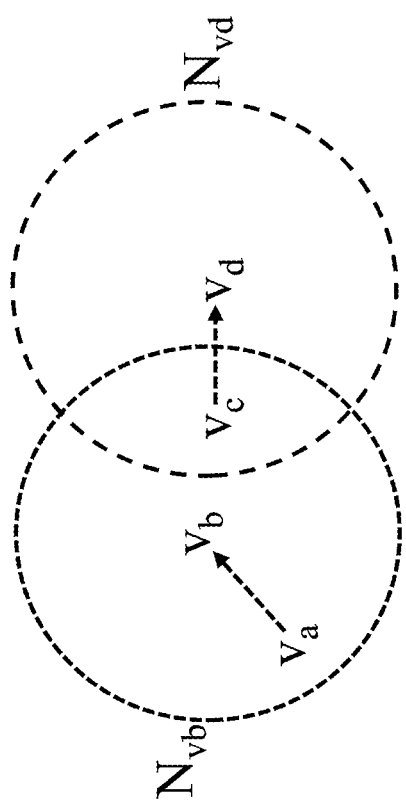
FIG. 7A is a schematic illustrating an example of two interfering wireless links $[v_a, v_b]$ and $[v_c, v_d]$, according to some embodiments of the present disclosure.

FIG. 7A is a schematic illustrating an example of two interfering wireless links [$v_a$, $v_b$] and [$v_c$, $v_d$], according to some embodiments of the present disclosure. For example, FIG. 7A shows an example of two interfering wireless links [$v_a$, $v_b$] and [$v_c$, $v_d$].

In this example, node $v_c$ is in the communication range of node $v_b$, i.e., $v_c \in N_{vb}$. Therefore, the transmission of node $v_c$ interferes with the transmission from node $v_a$ to node $v_b$.

Figure 7B:
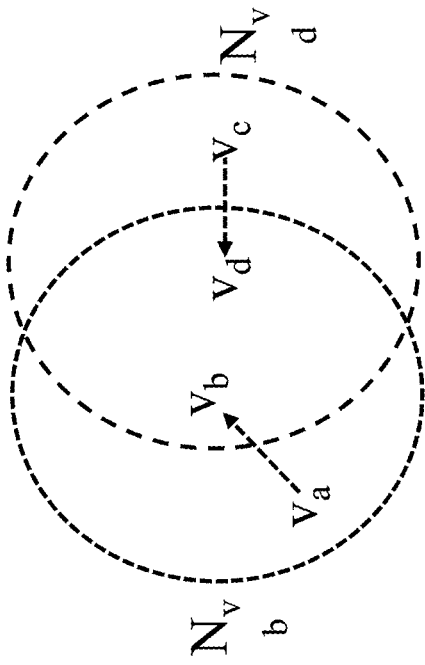
FIG. 7B is a schematic illustrating an example of two non-interfering wireless links $[v_a, v_b]$ and $[v_c, v_d]$, according to some embodiments of the present disclosure.

FIG. 7B is a schematic illustrating an example of two non-interfering wireless links [$v_a$, $v_b$] and [$v_c$, $v_d$], according to some embodiments of the present disclosure. For example, FIG. 7B shows an example of two non-interfering wireless links [$v_a$, $v_b$] and [$v_c$, $v_d$]. In this example, node $v_a$ is not in the communication range of node $v_d$ and node $v_c$ is in the communication range of node $v_b$. Therefore, node $v_a$ and node $v_c$ can transmit simultaneously without causing interference.

Scheduling Period and Data Flow

There are multiple TSN streams in a TSN network. Let S be the set of TSN streams in a TSN network. Each TSN stream has its own period and a pair of source and destination nodes.

To schedule all TSN streams, a scheduling period needs to be determined first. There are different ways to determine the scheduling period. The Least Common Multiple (LCM) is an efficient way to determine a scheduling period $h_p$ as:

$$h_p = \text{LCM}(s_i.T, \forall s_i \in S). \quad (3)$$

A schedule for a TSN stream is a determination of the transmission window defined in the form of
[Node ID, Queue ID, Time Offset, Transmission Duration],
where
Node ID identifies a specific node;
Queue ID identifies the queue whose data stream is scheduled to be transmitted;

Time Offset indicates the transmission starting time with respect to the start of the scheduling period $h_p$; and Transmission Duration indicates the total time needed to transmit the stream, wherein the transmission duration includes total transmission time, total guard time and propagation time.

Figure 8:
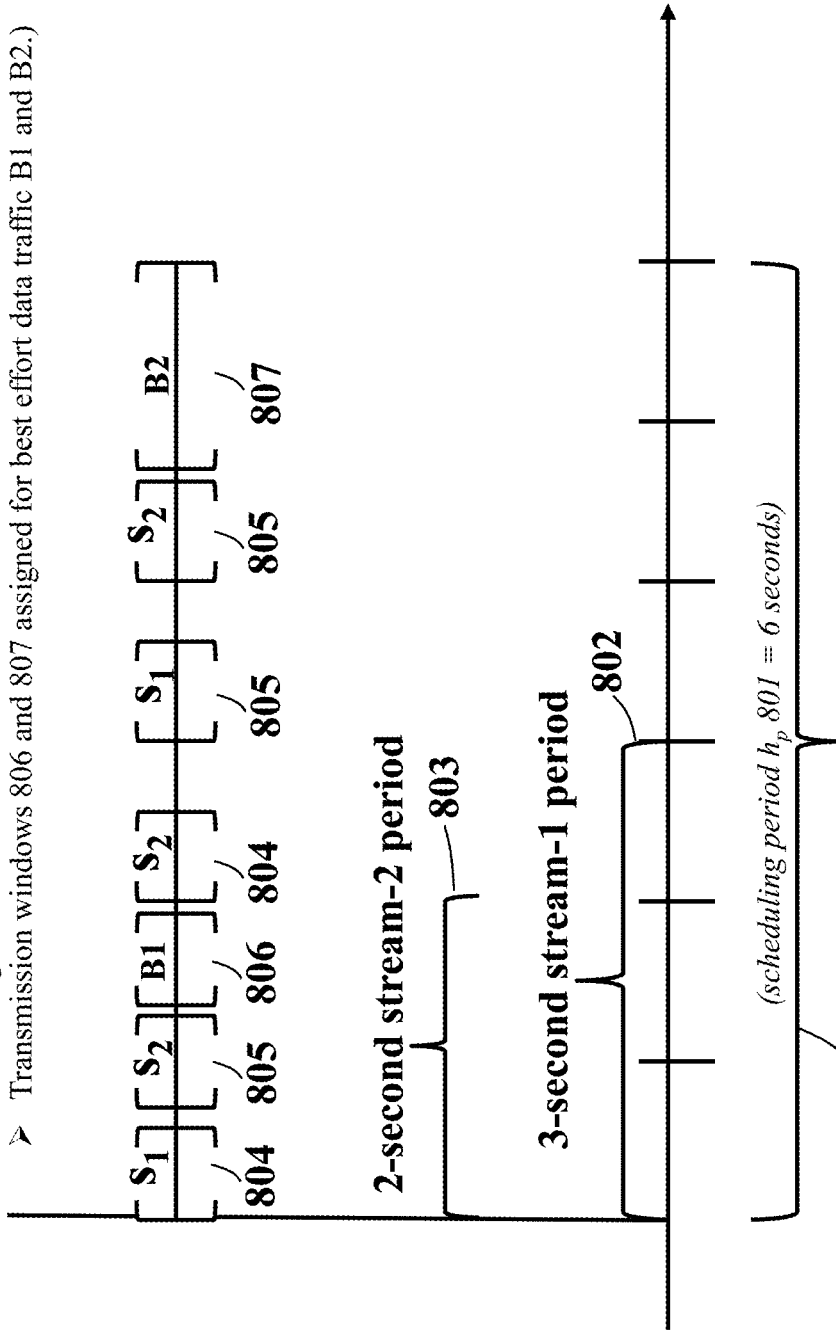
FIG. 8 is a schematic illustrating an example of determining the scheduling period and transmission windows scheduled for different types of traffic in a scheduling period within the time sensitive network, according to some embodiments of the present disclosure.

FIG. 8 is a schematic illustrating an example of determining the scheduling period and transmission windows scheduled for different types of traffic in a scheduling period within the time sensitive network, according to some embodiments of the present disclosure. For example, FIG. 8 shows an example of scheduling period determination with two TSN streams, in which stream-1 802 has period of 3 seconds and stream-2 803 has period of 2 seconds. The LCM of two periods is 6 seconds. Therefore, scheduling period $h_p$ 801=6 seconds. Within a scheduling period $h_p$, stream-1 gets two schedules represented by transmission window 804 and stream-2 gets three schedules represented by transmission window 805. Transmission windows 806 and 807 are assigned for best effort data traffic B1 and B2, respectively.

A TSN stream is assigned one or more transmission windows within a scheduling period $h_p$. Each transmission window schedules the transmission of the TSN stream for a TSN stream period. This transmission is named as data flow of the TSN stream. A TSN stream s has $h_p/s.T$ flows within each scheduling period $h_p$.

Let $f_{i,j}^{[vx, vy]}$ be the $j_{th}$ flow of a TSN stream $s_i$ traveling on the link $[v_x, v_y]$ via the path from source node $v_x$ to destination node $v_y$. Then, $f_{i,j}^{[vx, vy]}$ is represented as
$<f_{i,j}^{[vx, vy]}.\phi, f_{i,j}^{[vx, vy]}.\phi f, f_{i,j}^{[vx, vy]}.L, f_{i,j}^{[vx, vy]}.q, f_{i,j}^{[vx, vy]}.qd>$, where $f_{i,j}^{[vx, vy]}.\phi$ is the transmission time offset of the stream $s_i$ on the link in scheduling period $h_p$;

$f_{i,j}^{[vx, vy]}.\phi f$ is the starting time offset of flows of the stream $s_i$ and $f_{i,j}^{[vx, vy]}.\phi f = f_{i,j}^{[vx, vy]}.\phi + f*h_p/s_i.T$; (f=0, 1, $s_i$.T−1), $f_{i,j}^{[vx, vy]}.L$ is the transmission time of stream and given as $f_{i,j}^{[vx, vy]}.L = s_i.L/([vx,vy].r*[vx,vy].mt) + s_i.F*s_i.G/[vx, vy].mt + $ Optional BackoffTime/[vx, vy].mt;

$f_{i,j}^{[vx, vy]}.q$ is the queue that stores flow $f_{i,j}^{[vx, vy]}$; and $f_{i,j}^{[vx, vu]}.qd$ is the queuing delay.

where the Optional Backoff T time is only needed if CSMA is used, e.g., TSN over the WiFi network.

Scheduling Constraints

Constraint 1: Queue Constraints

At a TSN node, TSN streams are buffered in the queue before transmission. 802.11Qbv specifies at most 8 queues for an Ethernet egress port. A wireless node can be considered as a port, and therefore, it can have at most 8 queues as well. Let $F_i^{[vx, vy]}$ be the set of all flows of stream $s_i$ scheduled on link $[v_x, v_y]$. The queue ID constraint can be expressed as $$\forall s_i \in S, \forall [v_x, v_y] \in s_i.P, \forall f_{i,j}^{[vx, vy]} \in F_i^{[vx, vy]}, f_{i,j}^{[vx, vy]}.q \geq 1$$
and $$f_{i,j}^{[vx, vy]}.q \leq 8.$$

To consider best effort data, the TSN streams can be stored in the high priority queues.

A queue at a TSN node has a limited capacity, and therefore, the total amount of streams to be buffered in a queue needs to be less than the queue capacity. This constraint is expressed as $$\forall s_i \in S, \forall [v_x, v_y] \in s_i.P, \forall f_{i,j}^{[vx, vy]} \in F_i^{[vx, vy]},$$
$$Q[f_{i,j}^{[vx, vy]}.q].size + s_i.L \leq Q[f_{i,j}^{[vx, vy]}.q].capacity.$$

Constraint 2: Flow Constraint

For any flow of a TSN stream $s_i$ scheduled on a link $[v_x, v_y]$, time offset has to be greater than or equal to 0 and entire transmission window has to fit within stream period. This constraint can be expressed as $$\forall s_i \in S, \forall [v_x, v_y] \in s_i.P, \forall f_{i,j}^{[vx, vy]} \in F_i^{[vx, vy]}, f_{i,j}^{[vx, vy]}.\phi \geq 0$$
and $$f_{i,j}^{[vx, vy]}.\phi f + f_{i,j}^{[vx, vy]}.L \leq s_i.T.$$

This constraint bounds on the time offset of each flow to the period length and ensures that the whole flow fits inside of the stream period.

Constraint 3: Link Constraint

No two flows of different stream $s_i$ and stream $s_m$ scheduled on a link $[v_x, v_y]$ can overlap in time domain. This constraint can be expressed as $$\forall s_i, s_m \in S \text{ with } i \neq m, \forall [v_x, v_y] \in s_i.P \cap s_m.P,$$
$$\forall f_{i,j}^{[vx,vy]} \in F_i^{[vx,vy]}, \forall f_{m,k}^{[vx,vy]} \in F_m^{[vx,vy]},$$
$$\forall \alpha \in [0, h_p/s_i \cdot T], \forall \beta \in [0, h_p/s_m \cdot T],$$
$$f_{i,j}^{[vx,vy]} \cdot \phi + \alpha f_{i,j}^{[vx,vy]} \cdot T > f_{m,k}^{[vx,vy]} \cdot \phi + \beta f_{m,k}^{[vx,vy]} \cdot T +$$
$$f_{m,k}^{[vx,vy]} \cdot L + \frac{(f_{m,k}^{[vx,vy]} \cdot qd + [vx, vy] \cdot pd + [vx, vy] \cdot gi)}{[vx, vy] \cdot mt}$$

or $$rf_{i,j}^{[vx,vy]} \cdot \phi + \alpha f_{i,j}^{[vx,vy]} \cdot T + f_{i,j}^{[vx,vy]} \cdot L +$$
$$\frac{(f_{i,j}^{[vx,vy]} \cdot qd + [vx, vy] \cdot pd + [vx, vy] \cdot gi)}{[vx, vy] \cdot mt} < f_{m,k}^{[vx,vy]} \Phi + \beta f_{m,k}^{[vx,vy]} \cdot T.$$

Constraint 4: Wireless Interfering Link Constraint

Two flows of different streams, $s_i$ and $s_m$, scheduled on two interfering links $[v_x, v_y]$ and $[v_u, v_w]$ cannot overlap in time domain. This constraint can be expressed as $$f_{i,j}^{[vx,vy]} \cdot \phi + \alpha f_{i,j}^{[vx,vy]} \cdot T > f_{m,k}^{[vu,vw]} \cdot \phi + \beta f_{m,k}^{[vu,vw]} \cdot T +$$
$$f_{m,k}^{[vu,vw]} \cdot L + \frac{(f_{m,k}^{[vu,vw]} \cdot qd + [vu, vw] \cdot pd + [vu, vw] \cdot gi)}{[vu, vw] \cdot mt}$$

or $$rf_{i,j}^{[vx,vy]} \cdot \phi + \alpha f_{i,j}^{[vx,vy]} \cdot T + f_{i,j}^{[vx,vy]} \cdot L +$$
$$\frac{(f_{i,j}^{[vx,vy]} \cdot qd + [vx, vy] \cdot pd + [vx, vy] \cdot gi)}{[vx, vy] \cdot mt} < f_{m,k}^{[vu,vw]} \cdot \Phi + \beta f_{m,k}^{[vu,vw]} \cdot T.$$

Constraint 5: Flow Transmission Constraint

Each flow is transmitted successively over different hops along a routing path. Assuming that δ is the maximum timing error among different nodes, this constraint can be expressed as $$\forall s_i \in S, \forall [v_x, v_y], [v_y, v_z] \in s_i \cdot P,$$
$$\forall f_{i,j}^{[vx,vy]} \in F_i^{[vx,vy]}, \forall f_{i,j}^{[vy,vz]} \in F_i^{[vy,vz]},$$
$$f_{i,j}^{[vy,vz]} \cdot \phi - \frac{\delta}{[vy, vz] \cdot mt} \geq$$
$$f_{i,j}^{[vx,vy]} \cdot \phi + f_{i,j}^{[vx,vy]} \cdot L + \frac{(f_{i,j}^{[vx,vy]} \cdot qd + [vx, vy] \cdot pd)}{[vx, vy] \cdot mt}.$$

Constraint 6: End-To-End Delay Constraint

The end-to-end delay requirement has to be satisfied in order to keep a TSN stream valid. As an example, let us consider a TSN stream originated from node $v_a$ and destined to node $v_b$ with $v_{a+1}$, the first hop relay node, and $v_{b-1}$, the last relay node. This constraint can be expressed as $$\forall s_i \in S, \forall s_i \cdot P, \forall f_{i,j}^{[v_a,v_{a+1}]} \in F_i^{[v_a,v_{a+1}]}, \forall f_{i,j}^{[v_{b-1},v_b]} \in F_i^{[v_{b-1},v_b]},$$

$$f_{i,j}^{[v_{a2}v_{a+1}]} \cdot \phi + \frac{s_i \cdot E2E}{[v_a, v_{a+1}] \cdot mt} \geq$$

$$f_{i,j}^{[v_{b-1},v_b]} \cdot \phi + f_{i,j}^{[v_{b-1},v_b]} \cdot L + \frac{\left(f_{i,j}^{[v_{b-1},v_b]} \cdot qd + [v_{b-1}, v_b] \cdot pd\right)}{[v_{b-1}, v_b] \cdot mt}.$$

Optimal Scheduling in Wireless TSN Network

For a flow $f_{i,j} \in F_i$, the end-to-end delay is given by $$D_{i,j} = d_{v_a} + f_{i,j}^{[v_{b-1},v_b]} \cdot \phi + f_{i,j}^{[v_{b-1},v_b]} \cdot L + \frac{\left(f_{i,j}^{[v_{b-1},v_b]} \cdot qd + [v_{b-1}, v_b] \cdot pd\right)}{[v_{b-1}, v_b] \cdot mt} - f_{i,j}^{[v_a,v_{a+1}]} \cdot \phi,$$

where $d_{v_a}$ is the upper layer delay at node $v_a$ and the rest of delay is TSN delay.

For a $s_i \in S$, the end-to-end delay is given by $$D_i = \Sigma_j D_{i,j}.$$

For all TSN streams in a wireless TSN network, the end-to-end delay computed as $$D = \Sigma_i \Sigma_j D_{i,j}.$$

Optimal scheduling is to find transmission offsets and queue ID to minimize the total E2E delay $$\min_{f_{i,j}^{[v_x,v_y]} \cdot \phi, f_{i,j}^{[v_x,v_y]} \cdot q} D \quad (4)$$

subject to Constraints 1 to 6.

This scheduling problem can be converted into the mixed linear integer programming (MLIP) problem.

Gate Control List Generation

Each wired TSN node (relay node or end node) can have multiple ingress ports and multiple egress ports. As shown in FIGS. 2A and 3A, for each egress port, a wired TSN node (relay node or end node) can have up to eight queues to store data traffic. The transmission of data traffic is controlled by gate control list 206.

Each wireless TSN node (relay node or end node) has a wireless receiver and a wireless transmitter. A wireless receiver can be considered as an ingress port and a wireless transmitter can be considered as an egress port. As shown in FIGS. 2B and 3B, each wireless TSN node (relay node or end node) can also have up to eight queues to store data traffic. The transmission of data traffic is also controlled by gate control list 206.

Each queue 205 is associated with a gate 207, which can be either open or closed. However, data traffic (TSN streams or best effort data) can be transmitted from the queue only when the queue is open. Gate status is controlled by the gate control list. However, 802.1Q and 802.1Qbv do not provide the efficient method to create the gate control list. Therefore, it is desirable to provide the method to generate the gate control list.

For each TSN flow $f_{i,j}^{[v_x, v_y]}$ scheduled on the link $[v_x, v_y]$, optimal scheduler determines a schedule in the form of
[Node ID, Queue ID, Time Offset, Transmission Duration],
where
Node ID=$v_x$,
Queue ID=$f_{i,}^{[v_x,v_y]}$.q,
Time Offset=$f_{i,j}^{[v_x,v_y]}$.$\phi$ and $$\bullet \text{Transmission Duration} = f_{i,j}^{[v_x,v_y]} \cdot L + \frac{\left(f_{ij}^{[v_x,v_y]} \cdot qd + [v_x, v_y] \cdot pd\right)}{[v_x, v_y] \cdot mt}.$$

Therefore, the gate open time is $$f_{i,j}^{[v_x,v_y]} \cdot \phi$$

and gate close time is $$f_{i,j}^{[v_x,v_y]} \cdot \phi + f_{i,j}^{[v_x,v_y]} \cdot L + \frac{\left(f_{i,j}^{[v_x,v_y]} \cdot qd + [v_x, v_y] \cdot pd\right)}{[v_x, v_y] \cdot mt}.$$

These open times and close times form gate control list.

FIG. 9A is a schematic illustrating an example of scheduling a node that has multiple TSN streams stored in different priority queues, according to some embodiments of the present disclosure. For example, FIG. 9A shows an example of schedule for a TSN node that has multiple TSN streams stored in priority queues 5-8. Queues 1-4 are used for the lower priority best effort traffic. In contrast, TSN streams are stored in high priority queues.

Wherein, TSN Stream-1 is stored in queue-8 and has a time offset=0 and transmission duration=10 μs. Queue-7 stores two TSN streams Stream-2 and Stream-3.

Stream-2 has a time offset=10 μs and transmission duration=5 μs.

Stream-3 has a time offset=15 μs and transmission duration=8 μs.

TSN Stream-4 is stored in queue-6 and has a time offset=23 μs and transmission duration=7 μs.

TSN Stream-5 is stored in queue-5 and has a time offset=30 μs and transmission duration=3 μs.

FIG. 9B is a schematic illustrating an example of converting the schedule shown in FIG. 9A into the gate control list to control data traffic transmission by the TSN node, according to some embodiments of the present disclosure. For example, FIG. 9B shows an example of converting the schedule shown in FIG. 9A into the gate control list to control data traffic transmissions by the TSN node, where
o represents gate open,
c represents gate closed and
x indicates gate may open if data is available.

At time 0, gate-8 opens to transmit Stream-1 and the rest of seven queues are closed. Stream-1 takes 10 μs to transmit. At time=10 μs, gate-8 closes and gate-7 opens to transmit Stream-2 and Stream-3, which take 13 μs. At time=23 μs, gate-7 closes and gate-6 opens to transmit Stream-4, which takes 7 μs. At time=30 μs, gate-6 closes and gate-5 opens to transmit Stream-5, which takes 3 μs. Therefore, gate-5 closes at time=33 μs. After all priority queues closed, the best effort data may start transmission at time=33 μs.

Figure 10:
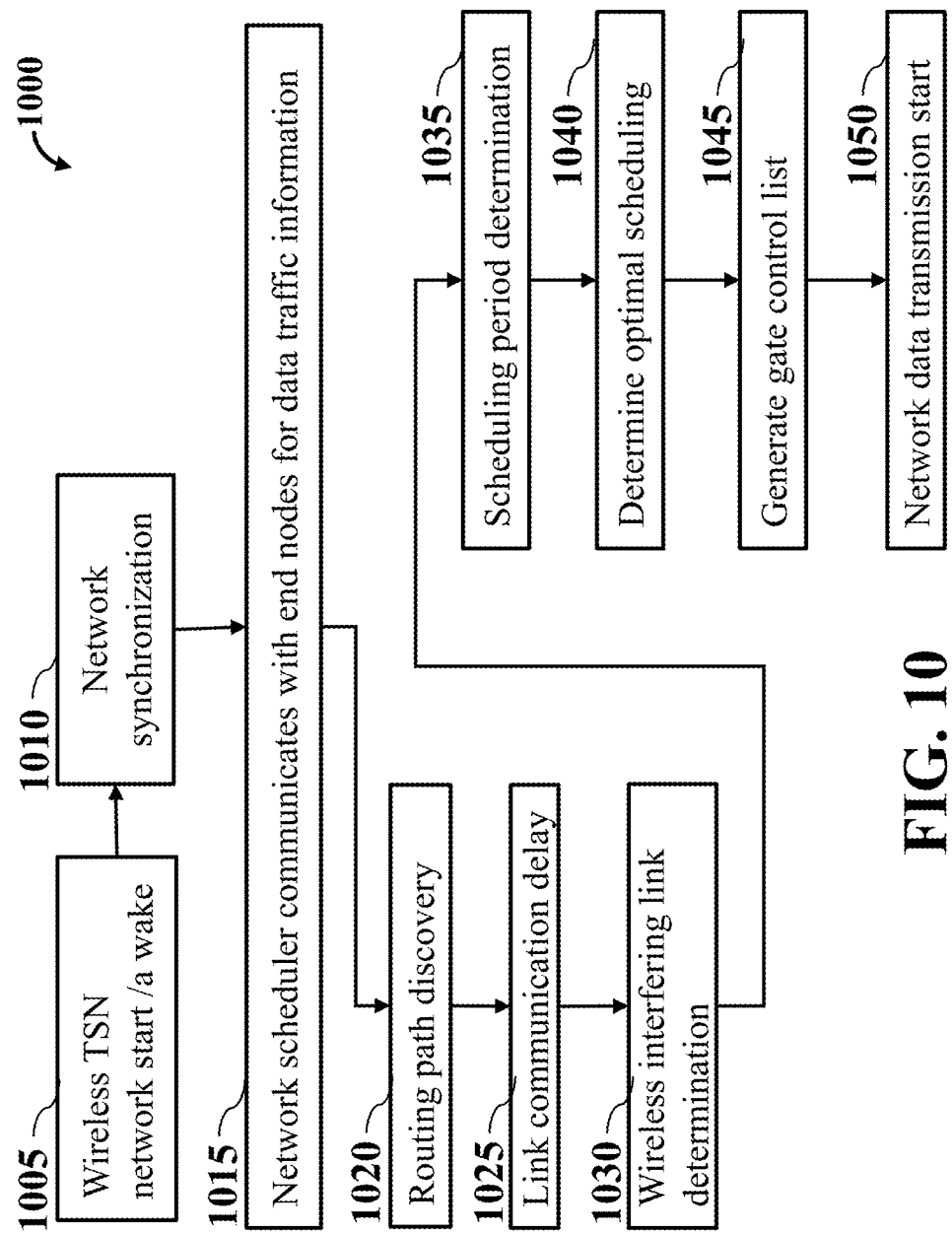
FIG. 10 is a block diagram illustrating some steps for a wireless scheduling method 1000 for a wireless TSN network operation, according to some embodiments of the present disclosure.

FIG. 10 is a block diagram illustrating some steps for a wireless scheduling method 1000 for a wireless TSN network operation, according to some embodiments of the present disclosure.

Step 1005 of FIG. 10 can include the wireless TSN network starting or waking all nodes (wired end nodes, wireless end nodes, wired relay nodes and wireless relay nodes) in the network.

Step 1010, once all nodes are stared and/or woken up, the wireless TSN network needs to synchronize clocks of nodes to a common clock 103 of FIG. 1A, called grandmaster clock by using IEEE 1588 Precision Time Protocol (PTP) standards series and IEEE 802.1AS Timing and Synchronization standard series.

Step 1015, once all nodes are synchronized to the grandmaster clock, the TSN network is ready to deliver data traffic. To delivery data traffic in a wireless TSN network, the network scheduler communicates with end nodes (wired end nodes and wireless end nodes) for data traffic information including TSN data traffic, i.e., TSN stream, and best effort data traffic. For a TSN stream, the information includes priority, end-to-end delay requirement, data period, number of frames within each period, size of the frame, upper layer delay, etc. The priority is used by priority filter 204 to buffer data into an appropriate queue as shown in FIGS. 2A, 2B, 3A and 3B. The rest of information can be used by network scheduler for delay calculation.

Step 1020, once data traffic information is ready, TSN network setup the routing paths by using IEEE 802.1Qca path reservation protocol. A routing path starts from the source node and ends at the destination node, each link on a routing path associates with a link transmission rate.

Step 1025, for a TSN stream, once the routing path is determined, scheduler can compute link communication delay for each link. The link communication delay is a portion of link delay that includes queueing delay as shown in equation (2). The queueing delay is determined by optimal scheduling.

Step 1030, In addition, once routing topology is determined, for each wireless link, scheduler needs to determine interfering links. These links cannot have overlapping transmission time.

Step 1035, next, scheduler needs to determine a scheduling period by using equation (3).

Step 1040, once the scheduling period is determined, the scheduler can determine the optimal scheduling by solving optimization problem (4), which provides information to generate 1080 gate control list for each egress port of the wired node and wireless transmitter.

Step 1045, is to generate gate control list for each egress port of the wired node and wireless transmitter.

Step 1050, after gate control list is formed, data transmission starts.

Figure 11:
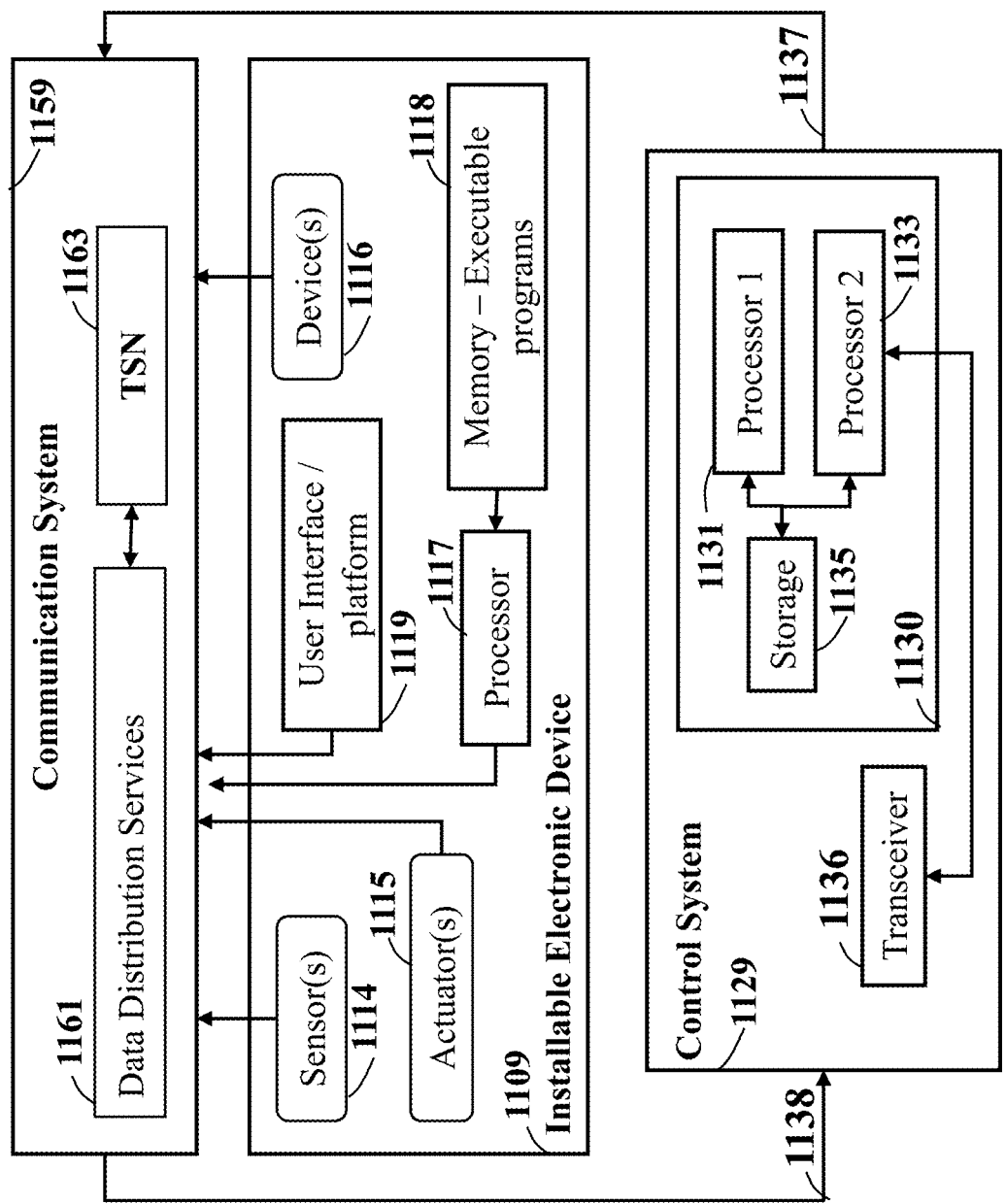
FIG. 11 is a schematic illustrating some components used to implement the wireless scheduling method 1000 of FIG. 10 for the wireless TSN network operation with factory automation such as production lines, industrial control, autonomous driving and smart grid applications.

FIG. 11 is a schematic illustrating some components used to implement the wireless scheduling method 1000 of FIG. 10 for the wireless TSN network operation with factory automation such as production lines, industrial control, autonomous driving, computer gaining and smart grid applications. For example, the method 1000 of FIG. 10 can be installed many different ways including by installing the method 1000 of FIG. 10 into an electronic device 1109. The electronic device 1109 having the installed methods 1000 of FIG. 10 of the present disclosure, may include a control system 1129 that controls operations of the installed electronic device 1109. The control system 1129 can obtain or receive data communicated among devices of the installed electronic device 1109, and can communicate data between installed other user products via a transceiver 1136. Data can be sent 1137 to a communication system 1159, or data can be received 1138 from the communication system 1159. All of which can depend on each user specific application control system data receiving/obtaining requirements, in order to allow for automated control of the installed electronic device 1109. The receiving/obtaining of data can provide information to user's operator(s) of the installed electronic device 1109 to do some action including a control action. The communication system 1159 can be used by the control system 1129 to communicate data between devices of the control system 1129 as well as to devices of the electronic device 1109, which can be controlled by the control system 1129. Wherein the communication system 1159 can include Data Distribution Services 1161 that is in communication with the TSN 1163.

Depending upon the user specific needs, the Data Distribution Service (DDS) 1161 can be for real-time systems as an Object Management Group (OMG) machine-to-machine (sometimes called connectivity framework) standard that aims to enable dependable, high-performance, interoperable, real-time, scalable data exchanges using a publish-subscribe pattern. DDS 1161 can address needs of applications like autonomous vehicles, robotics, power generation, simulation and testing, computing gaining, smart grid management, transportation systems, and other applications that require real-time data exchange.

DDS 1161 can be configured as a networking middleware that simplifies complex network programming, and can implement a publish-subscribe pattern for sending and receiving data, events, and commands among the nodes. Nodes that produce information (publishers) create "topics" (e.g., temperature, location, pressure) and publish "samples". The DDS 1161 can deliver the samples to subscribers that declare an interest in that topic. DDS 1161 can handle transfer chores: message addressing, data marshalling and demarshalling (so subscribers can be on different platforms from the publisher), delivery, flow control, retries, etc. Any node can be a publisher, subscriber, or both simultaneously. The DDS 1161 can publish-subscribe model virtually eliminates complex network programming for distributed applications.

The DDS 1161 can support mechanisms that go beyond the basic publish-subscribe model. The key benefit is that applications that use DDS 1161 for their communications are decoupled. Little design time needs be spent on handling their mutual interactions. In particular, the applications never need information about the other participating applications, including their existence or locations. The DDS 1161 can transparently handle message delivery without requiring intervention from the user applications, including: (a) determining who should receive the messages; (b) where recipients are located; and (c) what happens if messages cannot be delivered. Also, the DDS 1161 can allow the user to specify quality of service (QoS) parameters to configure discovery and behavior mechanisms up-front. By exchanging messages anonymously, DDS simplifies distributed applications and encourages modular, well-structured programs. DDS 1161 can also automatically handle hot-swapping redundant publishers if the primary fails. Subscribers always get the sample with the highest priority whose data is still valid (that is, whose publisher-specified validity period has not expired). It automatically switches back to the primary when it recovers, too.

The control system 1129 can be hardware connected with processors (1) & (2) 1131, 1133. The processors 1131, 1133, depending upon the user specific application requirements, may include other processors, microprocessors, specific circuits or integrated circuits, so as to perform one or more operations to control the installed electronic device 1109, according to the user's specific application.

Again, depending upon the user specific application(s), the control system 1129 can have a network module 1130 that can include data storage 1135 that connects to the processors (1) & (2), 1131, 1133. The network module 1130 can be used as a TSN module that can include a software module that implements a specific function in a network stack, such as a data, link interface, a transport protocol, or a network application, etc., i.e. depending upon the user specific application needs. For example, communication system 1159 can provide data from the installed electronic device 1109 and the data storage 1135 to the network module 1130. Depending on the user specific applications, the processor(s) 1131, 1133 of the network module 1130 can be programmed with specific models related to one of factory automation, industrial control, autonomous driving, computer gaining and smart grid systems, that use the installed electronic device(s) 1109. The network module 1130 is configured to receive TSN data traffic and then determine a type for each received data traffic, including types such (a) periodic traffic, (b) event-based traffic, (c) streaming traffic and the (d) best effort traffic. Wherein the types are divided into two types, (a) time critical traffic; In the TSN network, data are scheduled such that time-critical traffic needs to be delivered on time. The time-critical TSN traffic are typically periodic and different TSN traffic can have different periods.

(b) best effort traffic.

In the TSN network, data are scheduled such that time-critical traffic needs to be delivered on time. The time-critical TSN traffic are typically periodic and different TSN traffic can have different periods. For a TSN traffic, the amount of data produced in each period is same. IEEE 802.1Q standard series are designed for scheduling traffic in TSN networks. By defining queues based on traffic priority, TSN tries to ensure a bounded maximum latency for scheduled time-critical traffic through switched networks. For example, based on the type of data, i.e. time-critical TSN traffic or best effort traffic data, the network module 1130 can generate a schedule to transmit each data frame through the communication system 1159, and then may transmit the data frames based on that schedule. Further, the control system 1129 can control operations of the installed electronic device 1109 based on the transmitted data frame(s). The data storage 1135 can include stored software to execute programs via the processor 1131, 1133 and the network module 1130 to initiate so as to provide operability for some of the features of the methods of the present disclosure. Contemplated is that the network module 1130 can use the stored prioritization information and/or stored routing information in the storage 1135 to make some prioritization of the data and/or routing path that may be transmitted back to the installed electronic device 1109 or to other systems, according to a user's specific interests that may be related to operational aspects or as providing data to some other operation/system. Because the installed electronic device 1109 includes sensors and attributes that can be customized to a user's specific needs, any addition attribute added to the installed electronic device 1109 can be utilized by the user. Wherein, any such aspect discovered or obtained by the additional attribute to the installed electronic device 1109 can be communicated to other systems, user operators, etc. via the communication system 1159.

The versatility of the installed electronic device 1109 is customizable to user's specific interests, such that an increased data communication between the wireless TSN network operation and user's is possible. For example, communication system 1159 can communicate data between several devices of the installed electronic device 1109, including sensors 1114 (i.e. cameras, videos, types of detectors such as light, heat, vibration, etc.), that can detect, measure and record, etc. data. The sensor data can then be communicated to the communications system 1159 and used for manage operations of the intended operation, i.e. production lines, industrial control, autonomous driving, computer gaining and smart grid applications, such as maintenance, operational efficiency, etc. Depending upon a user specific need, the sensor data can be utilized by user operators to initiate some action via the communication system 1159, control system 1129, that may include activating actuators 1115 (associated with components of production lines, industrial control, autonomous driving, computer gaining, etc.) or other devices 1116. Contemplated is that a processor 117, a memory 1118 and a user interface/platform 1119 can utilized by a user or operator of the communication system 1159 or control system 1129.

Figure 12:
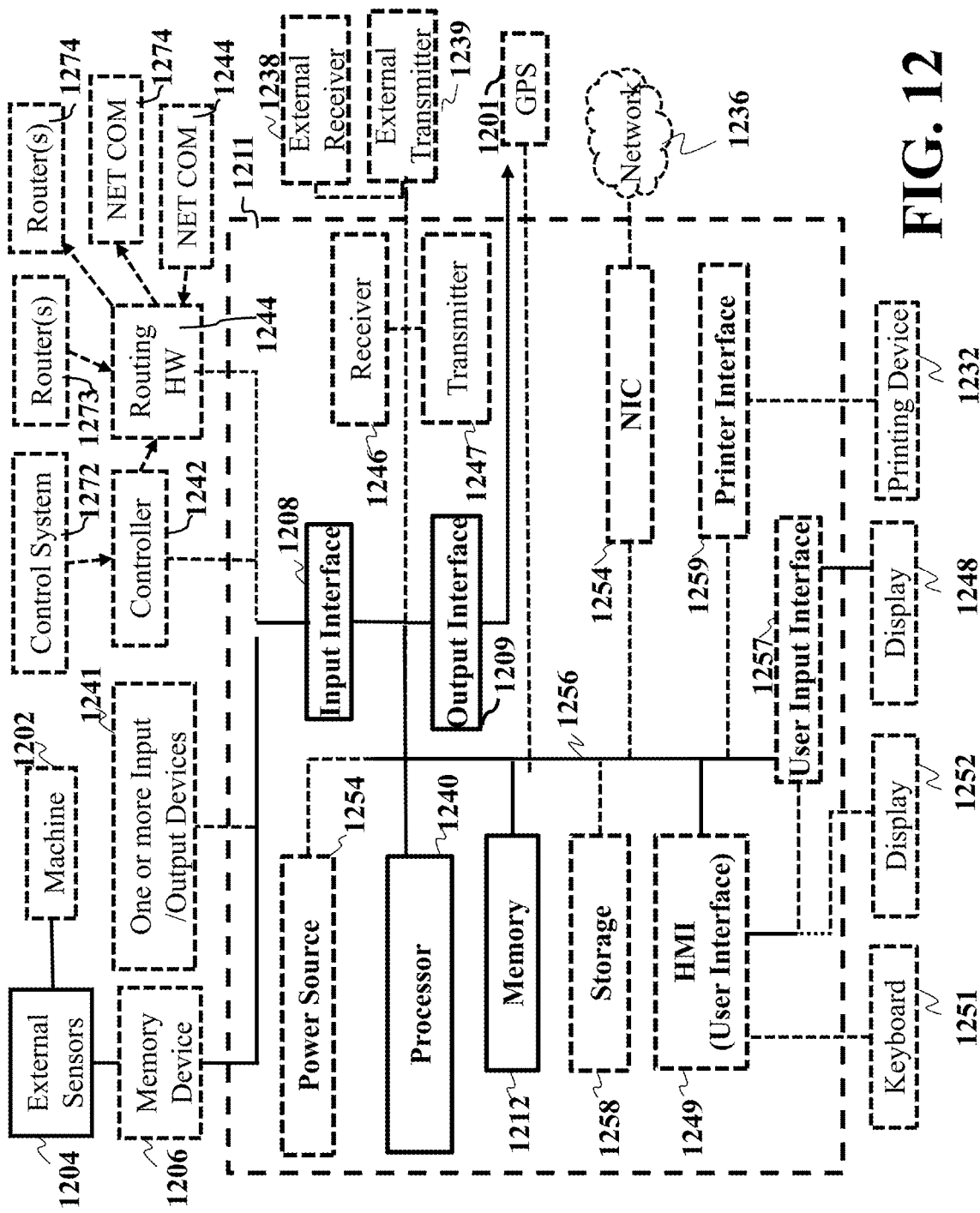
FIG. 12 is a block diagram of illustrating the method of FIG. 10, that can be implemented using alternate components or in combination with the components of FIG. 11, according to embodiments of the present disclosure.

FIG. 12 is a block diagram of illustrating the method of FIG. 1A, that can be implemented using alternate components or in combination with the components of FIG. 11A, according to embodiments of the present disclosure. For example FIG. 12 can be a controller 1211 including a processor 1240, computer readable memory 1212, storage 1258 and user interface 1249 with display 1252 and keyboard 1251, which are connected through bus 1256. For example, the user interface 1249 in communication with the processor 1240 and the computer readable memory 1212, acquires and stores the data in the computer readable memory 1212 upon receiving an input from a surface, keyboard surface, of the user interface 1257 by a user.

Contemplated is that the memory 1212 can store instructions that are executable by the processor, historical data, and any data to that can be utilized by the methods and systems of the present disclosure. The processor 1240 can be a single core processor, a multi-core processor, a computing cluster, or any number of other configurations. The processor 1240 can be connected through a bus 1256 to one or more input and output devices. The memory 1212 can include random access memory (RAM), read only memory (ROM), flash memory, or any other suitable memory systems.

Still referring to FIG. 12, a storage device 1258 can be adapted to store supplementary data and/or software modules used by the processor. For example, the storage device 1258 can store historical data and other related data as mentioned above regarding the present disclosure. Additionally, or alternatively, the storage device 1258 can store historical data similar to data as mentioned above regarding the present disclosure. The storage device 1258 can include a hard drive, an optical drive, a thumb-drive, an array of drives, or any combinations thereof.

The system can be linked through the bus 1256 optionally to a display interface (not shown) adapted to connect the system to a display device (not shown), wherein the display device can include a computer monitor, camera, television, projector, or mobile device, among others.

The controller 1211 can include a power source 1254, depending upon the application the power source 1254 may be optionally located outside of the controller 1211. Linked through bus 1256 can be a user input interface 1257 adapted to connect to a display device 948, wherein the display device 1248 can include a computer monitor, camera, television, projector, or mobile device, among others. A printer interface 1259 can also be connected through bus 1256 and adapted to connect to a printing device 1232, wherein the printing device 1232 can include a liquid inkjet printer, solid ink printer, large-scale commercial printer, thermal printer, UV printer, or dye-sublimation printer, among others. A network interface controller (NIC) 1254 is adapted to connect through the bus 1256 to a network 1236, wherein data or other data, among other things, can be rendered on a third-party display device, third party imaging device, and/or third-party printing device outside of the controller 1211. Further, the bus 1256 can be connected to a Global Positioning System (GPS) device 1201 or a similar related type device.

Still referring to FIG. 12, the data or other data, among other things, can be transmitted over a communication channel of the network 1236, and/or stored within the storage system 1258 for storage and/or further processing. Further, the data or other data may be received wirelessly or hard wired from a receiver 1246 (or external receiver 1238) or transmitted via a transmitter 1247 (or external transmitter 1239) wirelessly or hard wired, the receiver 1246 and transmitter 1247 are both connected through the bus 1256. The controller 1211 may be connected via an input interface 1208 to external routing hardware device(s) 1244 and external input/output devices 941. The controller 1242 may be connected to an external control system 1272 (similar to the control system 1129 of FIG. 11), and to a routing hardware device 1244. The routing hardware device 1244 can have incoming data from router(s) 1273 and network communication device(s) 1244. Wherein the routing hardware device 1244 can have outgoing data to router(s) 12 1274 and network communication device(s) 1274. Also, an exterior memory device 1206 can be connected to external sensors 1204 and machine 1202, the memory device can be connected to the bus 1256. An output interface 1209 may be used to output the processed data from the processor 1240 via bus 1256.

Figure 13A:
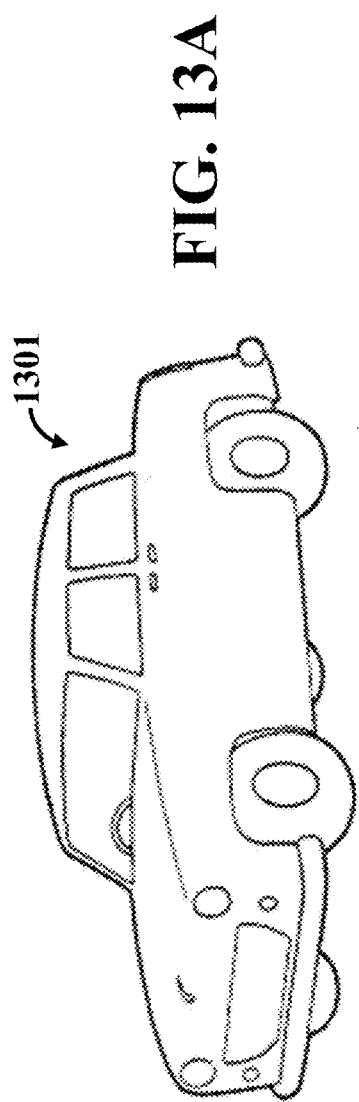
FIG. 13A and FIG. 13B are schematics illustrating some examples of systems having control systems that use one or more embodiments of the methods of the present disclosure, according to some embodiments of the present disclosure.
Figure 13B:
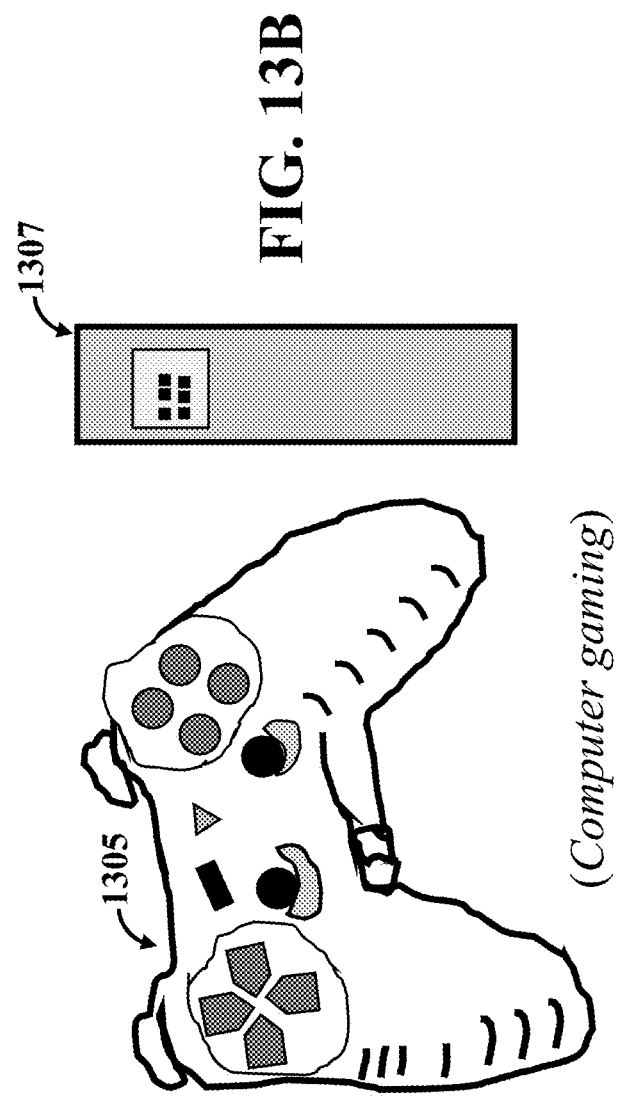

FIG. 13A and FIG. 13B are schematics illustrating some examples of systems having control systems that use one or more embodiments of the methods of the present disclosure, according to some embodiments of the present disclosure.

For example, FIG. 13A shows an autonomous driving vehicle 1301 that includes a control system that controls operations (e.g., movement and other actions) of the autonomous driving vehicle 1301 based on data obtained by, generated by, and/or communicated among devices of the autonomous driving vehicle 1301. For example, the control system can control one or more powered system (not shown) associated with the autonomous driving vehicle 1301, such that the control system can controls operations (e.g., driver warnings, automated movement, or other actions) of the automobile based on data obtained by, generated by, and/or communicated among devices of the autonomous driving vehicle 1301. Wherein one or more methods of the present disclosure can be incorporated into the systems of the autonomous driving vehicle 1301.

FIG. 13B shows a computer gaining console 1307 with a gaining device 1305, wherein the computer gaining console 1307 includes a control system that controls operations (e.g., movement and other actions) of the computer game. Wherein one or more methods of the present disclosure can be incorporated into the systems of the computer gaining console 1307.

Figure 14:
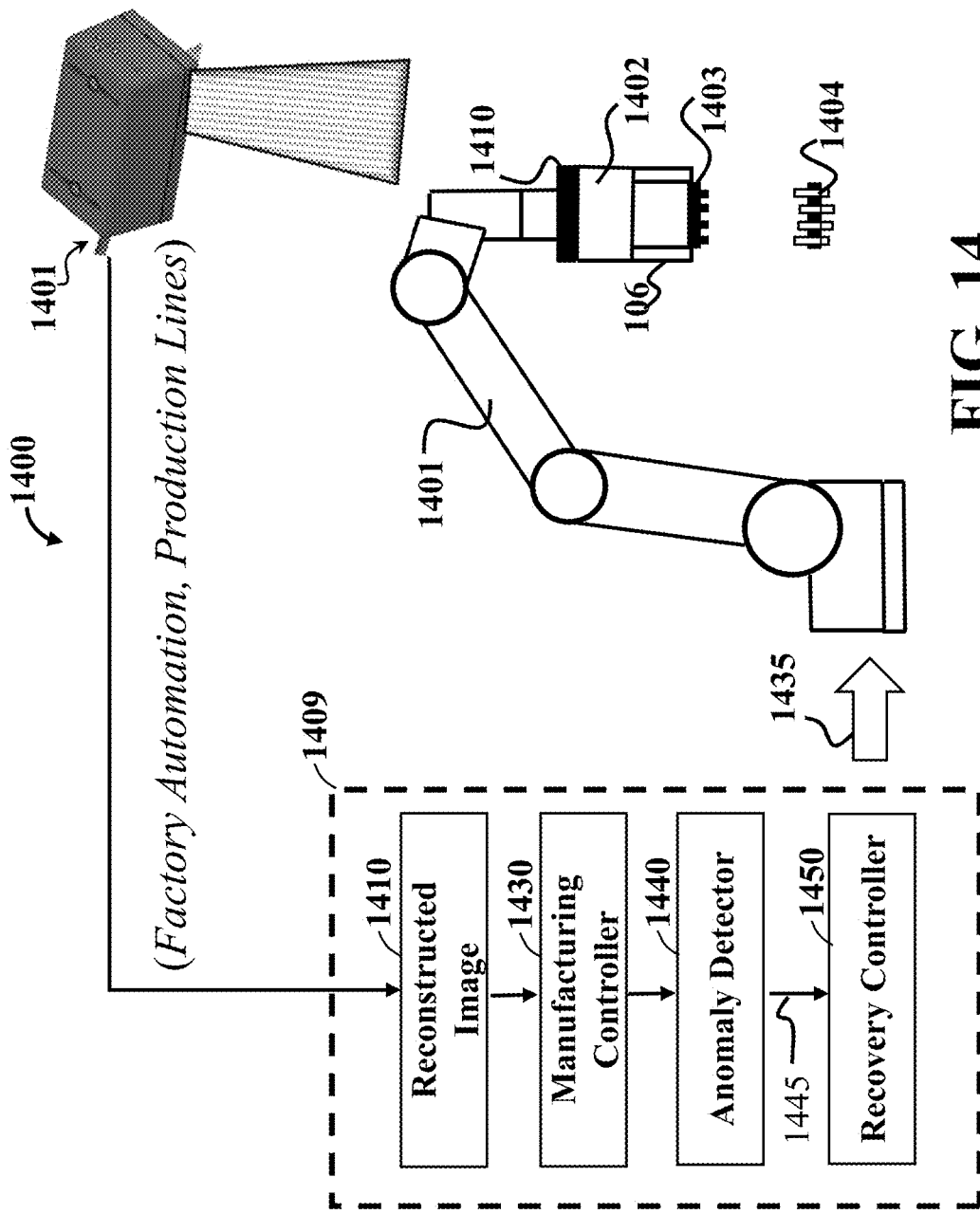
FIG. 14 is a schematic illustrating a system having control systems that use one or more embodiments of the methods of the present disclosure, according to some embodiments of the present disclosure.

FIG. 14 is a schematic illustrating a system having control systems that use one or more embodiments of the methods of the present disclosure, according to some embodiments of the present disclosure. FIG. 14 shows a schematic of an automation system 1400 including a control system 1409, wherein the methods of the present disclosure can be incorporated, according to some embodiments. The automation system 1400 includes a control system 1409 having one or combination of, a manufacturing controller 1430 configured to control 1435 an equipment 1401 manufacturing a target object, and an anomaly detector 1440 configured to inspect the image of the layer 1410 of target object after and/or during the manufacturing process, and a recovery controller 1450 configured to cause a modification of the control of the equipment 1401 based on a negative result of the inspection.

The equipment 1401 can be a robotic assembly performing an operation including an insertion of a component along an insertion line to assemble a target object. The robotic assembly includes a robotic arm that inserts a first component 1403 into a second component 1404. In some embodiments, the robotic arm includes a wrist 1402 for ensuring multiple degrees of freedom of moving the component 1403. In some implementations, the wrist 1402 has a gripper 1406 for holding the mobile component 1403. Examples of target object include a semiconductor, a transistor, a photonic integrated circuit (PIC), etc. Wherein one or more methods of the present disclosure can be incorporated into the systems of the automation system 1400.

Features

A system for scheduling data traffic in a wireless time sensitive network (TSN). The system including a computer in communication with a memory. The computer is configured to synchronize clocks of all nodes with a common clock in the TSN. Obtain data traffic information for the TSN using a network scheduler to establish routing paths, by communicating with wired and wireless end nodes for TSN data traffic, such that the TSN data traffic includes TSN data streams and the best effort data traffic. Determine routing paths using the obtained data traffic information and storing routing information into the memory. Such that each routing path begins from a source node and ends at a destination node, along with one or more relay nodes connecting the source node to the destination node. Compute a link communication delay for each link of the one or more relay nodes connecting a source node to a destination node of the TSN for each TSN stream using a network scheduler. Wherein the link communication delay includes a transmission duration that is a portion of a link delay that includes a queueing delay, such that the queueing delay is determined by an optimal scheduling module. Wherein the transmission duration includes a total time to transmit all frames in the TSN stream and a total inter-frame-guard-time. Determine interfering links for each wireless link using the network scheduler, so that the interfering links do not have an overlapping transmission time. Determining a scheduling period using the network scheduler, so that each TSN stream is transmitted at least once in a scheduling period. Determine optimal schedules using an optimal scheduling module, wherein a schedule for a TSN stream is a transmission window in the form of a schedule for a TSN stream is a transmission window in a form of a Node ID, a Queue ID, a Time Offset and a Transmission Duration, wherein for a queue identified by the Queue ID of a node identified by the Node ID, the Time Offset corresponds to a gate open time, and the Time Offset plus the Transmission Duration corresponds to a gate close time, so as to generate a gate control list for each egress port of the wired node and a wireless transmitter of the TSN and start transmission of the data based on the generated gate control list.

4. Another embodiment of the present disclosure, a method for scheduling data traffic in a wireless time sensitive network (TSN). The method including synchronizing clocks of all nodes with a common clock in the TSN. Wherein the nodes include end nodes and relay nodes, the end nodes include wired and wireless data source and destination nodes, and relay nodes include wired and wireless bridges/switches/routers/access points. Obtaining data traffic information using a network scheduler for the TSN to establish routing paths, by communicating with the wired and wireless end nodes for TSN data traffic. Such that the TSN data traffic includes TSN data streams and best effort data traffic. Wherein the TSN data stream is time prioritized into time critical data traffic and the best effort traffic data is classified as non-time critical data. Determining routing paths using the obtained data traffic information and stored routing information via the memory, such that each routing path begins from a source node and ends at a destination node, along with one or more relay nodes connecting the source node to the destination node. Computing a link communication delay for each link of the one or more relay nodes connecting the source node to the destination node for each TSN stream using a network scheduler. Wherein the link communication delay includes a transmission duration that is a portion of a link delay that includes a queueing delay, such that the queueing delay is determined by an optimal scheduling module. Wherein the transmission duration includes a total time to transmit all frames in the TSN stream and a total inter-frame-guard-time. Determining interfering links for each wireless link using the network scheduler, so that the interfering links do not have an overlapping transmission time. Determining a scheduling period using the network scheduler, so that each TSN stream is transmitted at least once in a scheduling period. Determining optimal scheduling using an optimal scheduling module, wherein a schedule for a TSN stream is a transmission window in a form of a Node ID, a Queue ID, a Time Offset and a Transmission Duration, wherein for a queue identified by the Queue ID of a node identified by the Node ID, the Time Offset corresponds to a gate open time, and the Time Offset plus the Transmission Duration corresponds to a gate close time, so as to generate a gate control list for each egress port of the wired node and a wireless transmitter of the TSN, wherein the time-critical TSN data streams are to be delivered to meet an end-to-end delay requirement and the best effort data is transmitted if the TSN data streams do not occupy a whole scheduling period determined according to equation (3). Start transmission of the data based on the generated gate control list.

Another embodiment of the present disclosure, a system for scheduling data traffic in a wireless time sensitive network (TSN). The system includes a computer in communication with a memory. The computer is configured to synchronize clocks of all nodes with a common clock in the TSN. Wherein the nodes include end nodes and relay nodes, the end nodes include wired and wireless data source and destination nodes, and relay nodes include wired and wireless bridges/switches/routers/access points. Obtain data traffic information using a network scheduler for the TSN to establish routing paths, by communicating with the wired and wireless end nodes for TSN data traffic. Such that the TSN data traffic includes TSN data streams and the best effort data traffic. Wherein the TSN data stream is time prioritized into time critical data traffic and the best effort traffic data is classified as non-time critical data. Determine routing paths using the obtained data traffic information and stored routing information via the memory. Such that each routing path begins from a source node and ends at a destination node, along with one or more relay nodes connecting the source node to the destination node. Compute a link communication delay for each link of the one or more relay nodes connecting the source node to the destination node for each TSN stream using a network scheduler. Wherein the link communication delay includes a transmission duration that is a portion of a link delay that includes a queueing delay, such that the queueing delay is determined by an optimal scheduling module. Wherein the transmission duration includes a total time to transmit all frames in the TSN stream and a total inter-frame-guard-time. Determine interfering links for each wireless link using the network scheduler, so that the interfering links do not have an overlapping transmission time. Determining a scheduling period using the network scheduler, so that each TSN stream is transmitted at least once in a scheduling period. Determine optimal scheduling using an optimal scheduling module, wherein a schedule for a TSN stream is a transmission window in a form of a Node ID, a Queue ID, a Time Offset and a Transmission Duration, wherein for a queue identified by the Queue ID of a node identified by the Node ID, the Time Offset corresponds to a gate open time, and the Time Offset plus the Transmission Duration corresponds to a gate close time, so as to generate a gate control list for each egress port of the wired node and a wireless transmitter of the TSN and start transmission of the data based on the generated gate control list.

Another embodiment of the present disclosure, anon-transitory computer readable storage medium embodied thereon a program executable by a computer for performing a method. The method for scheduling data traffic in a wireless time sensitive network (TSN). The includes synchronizing clocks of all nodes with a common clock in the TSN, wherein the nodes include end nodes and relay nodes, the end nodes include wired and wireless data source and destination nodes, and relay nodes include wired and wireless bridges/switches/routers/access points. Obtaining data traffic information using a network scheduler for the TSN to establish routing paths, by communicating with the wired and wireless end nodes for TSN data traffic, such that the TSN data traffic includes TSN data streams and best effort data traffic. Wherein the TSN data stream is time prioritized into time critical data traffic and the best effort traffic data is classified as non-time critical data. Determining routing paths using the obtained data traffic information and stored routing information via the memory. Such that each routing path begins from a source node and ends at a destination node, along with one or more relay nodes connecting the source node to the destination node. Computing a link communication delay for each link of the one or more relay nodes connecting the source node to the destination node for each TSN stream using a network scheduler. Wherein the link communication delay includes a transmission duration that is a portion of a link delay that includes a queueing delay, such that the queueing delay is determined by an optimal scheduling module. Determining interfering links for each wireless link using the network scheduler, so that the interfering links do not have an overlapping transmission time. Determining a scheduling period using the network scheduler, so that each TSN stream is transmitted at least once in a scheduling period. Determining optimal scheduling using an optimal scheduling module, wherein a schedule for a TSN stream is a transmission window in a form of a Node ID, a Queue ID, a Time Offset and a Transmission Duration, wherein for a queue identified by the Queue ID of a node identified by the Node ID, the Time Offset corresponds to a gate open time, and the Time Offset plus the Transmission Duration corresponds to a gate close time, so as to generate a gate control list for each egress port of the wired node and a wireless transmitter of the TSN and start transmission of the data based on the generated gate control list.

The following aspects are intended to either individually or in combination, create one or more embodiments based on the one or more combination of aspects listed below, for the above recited systems and methods in the Features Section.

An aspect includes the nodes of the TSN are started or woken up prior to the synchronizing of the clocks of all the nodes with the common clock in the TSN. Another aspect is that the wired and wireless nodes of the TSN include wired end nodes, wireless end nodes, wired relay nodes and wireless relay nodes. It is possible an aspect can be the synchronizing of the clocks of all the nodes to the common is by using IEEE 1588 Precision Time Protocol (PTP) standards series and IEEE 802.1AS Timing and Synchronization standard series. An aspect is that the TSN data traffic includes periodic data stream and event-based data traffic.

Another aspect is that the TSN data stream includes: (a) prioritization data that maps data traffic to a queue with appropriate priority; (b) an end-to-end delay requirement; (c) a data period; (d) a number of frames within each period; and (e) a size of a data frame such that the TSN stream includes one or more data frames. An aspect can include the prioritization data is used by a priority filter to place data into a prioritized queue identification (ID) location, such that the prioritized queue ID location identifies a queue whose data stream is scheduled to be transmitted, wherein each wired node and wireless node includes up to eight queues. Another aspect can be that the end-to-end delay requirement is a summation of delays at all the nodes along a routing path, such that the end-to-end delay includes an upper layer queueing delay and a TSN delay. Such that an aspect is that the wired end nodes and wireless end nodes include data traffic source nodes, such that the upper layer queueing delay is measured at a data traffic source node, and is a time difference from a time that data traffic is produced to a time the data traffic reaches a link layer, wherein the link layer is a TSN layer. Wherein, an aspect is that the TSN delay is a time difference from a time that data traffic reaches the link layer at the data traffic source node to a time the data traffic reaches the link layer of a destination node, wherein the data traffic is forwarded up to an application without a delay. Further an aspect is that the data period is an amount of time according to which the data is produced or generated. Another aspect is that the number of frames within each period includes data frames that need to be transmitted as a stream so that an inter-frame-guard-time separates transmission of two consecutive frames. Still another aspect is that the size of the frame is measured as number of data bits.

An aspect can include that the time-critical TSN data streams are to be delivered to meet a delay requirement and the best effort data is transmitted if the TSN data streams do not occupy a whole scheduling period. Another aspect is that the stored routing information is obtained by using IEEE 802.1Qca path reservation protocols.

Embodiments

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

In addition, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, with machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Further, embodiments of the present disclosure and the functional operations described in this specification can be implemented in digital electronic circuitry, in tangibly embodied computer software or firmware, in computer hardware, including the structures disclosed in this specification and their structural equivalents, or in combinations of one or more of them. Further, some embodiments of the present disclosure can be implemented as one or more computer programs, i.e., one or more modules of computer program instructions encoded on a tangible non-transitory program carrier for execution by, or to control the operation of, data processing apparatus. Further still, program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure, the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A system for scheduling data traffic in a wireless time sensitive network (TSN) having nodes that are wired nodes and wireless nodes, comprising:
   a computer in communication with a memory, the computer is configured to
      synchronize clocks of all nodes with a common clock in the TSN, then a network scheduler communicates with a set of nodes to deliver data traffic to the TSN, to prioritize the data traffic as TSN data streams classified as time critical data traffic and non-time critical data traffic;
      determine link layer routing paths using the data traffic and stored routing protocol data, and compute for each link layer routing path, a link communication delay for each link of one or more relay nodes connecting a source node to a destination node for each TSN stream using a network scheduler, wherein the link communication delay includes a transmission duration that is a portion of a link delay, the transmission duration includes a total transmission time, a total guard time, and the link delay includes a queueing delay;
      determine interfering links for each wireless link using the network scheduler, wherein the interfering links do not have an overlapping transmission time, then, determine a scheduling period using the network scheduler, for transmission of each TSN stream at least once in a scheduling period;
      determine optimal scheduling using an optimal scheduling module, to generate a gate control list for each egress port of the wired node and a wireless transmitter of the TSN, then generate the gate control list for each egress port of the wired node and the wireless transmitter of the TSN; and
      begin transmission of the data based on the generated gate control list.

2. The system of claim 1, wherein the synchronizing of the clocks of all nodes with the common clock in the TSN is based on using IEEE 1588 Precision Time Protocol (PTP) standards series and IEEE 802.1AS Timing and Synchronization standard series, in order for the TSN to be prepared to deliver data traffic, and wherein the stored routing protocol data is IEEE 802.1Qca path reservation protocols.

3. The system of claim 1, wherein the set of nodes includes wired end nodes and wireless end nodes, and the data traffic is prioritized into TSN data streams that is classified as the time critical data traffic and best effort traffic data that is classified as the non-time critical data traffic.

4. The system of claim 1, wherein a schedule for a TSN stream is a transmission window in a form of a Node ID, a Queue ID, a Time Offset and a Transmission Duration, wherein for a queue identified by the Queue ID of a node identified by the Node ID, the Time Offset corresponds to a gate open time, and the Time Offset plus the Transmission Duration corresponds to a gate close time.

5. A method for scheduling data traffic in a wireless time sensitive network (TSN), comprising:

synchronizing clocks of all nodes with a common clock in the TSN, then a network scheduler communicates with a set of nodes to deliver data traffic to the TSN, to prioritize the data traffic as TSN data streams classified as time critical data traffic and non-time critical data traffic;

determining link layer routing paths using the data traffic and stored routing protocol data; compute for each link layer routing path, a link communication delay for each link of one or more relay nodes connecting a source node to a destination node for each TSN stream using a network scheduler, wherein the link communication delay includes a transmission duration that is a portion of a link delay, the transmission duration includes a total transmission time to transmit all frames in the TSN stream and a total inter-frame-guard-time, and the link delay includes a queueing delay;

determining interfering links for each wireless link using the network scheduler, wherein the interfering links do not have an overlapping transmission time, then, determining a scheduling period using the network scheduler, for transmission of each TSN stream at least once in a scheduling period, followed by determining optimal scheduling using an optimal scheduling module, to generate a gate control list for each egress port of the wired node and a wireless transmitter of the TSN;

generating the gate control list for each egress port of the wired node and the wireless transmitter of the TSN; and starting transmission of the data based on the generated gate control list.

6. The method of claim 5, wherein a schedule for a TSN stream is a transmission window in a form of a Node ID, a Queue ID, a Time Offset and a Transmission Duration, wherein for a queue identified by the Queue ID of a node identified by the Node ID, the Time Offset corresponds to a gate open time, and the Time Offset plus the Transmission Duration corresponds to a gate close time.

7. The method of claim 5, wherein nodes of the TSN are started or woken up prior to the synchronizing of the clocks of all the nodes with the common clock in the TSN, and wherein the set of nodes includes wired end nodes and wireless end nodes, and wherein the data traffic is prioritized into TSN data streams that is classified as the time critical data traffic and best effort traffic data that is classified as the non-time critical data traffic.

8. The method of claim 5, wherein the TSN data traffic includes periodic data stream and event-based data traffic, and wherein the queueing delay is determined using the optimal scheduling module.

9. The method of claim 5, wherein the TSN data stream includes
(a) prioritization data that maps data traffic to a queue with appropriate priority,
(b) an end-to-end delay requirement,
(c) a data period for data production or generation,
(d) a number of frames within each period, and
(e) a size of a data frame such that the TSN stream includes one or more data frames.

10. The method of claim 9, wherein the prioritization data is used by a priority filter to place data into a prioritized queue identification (ID) location, such that the prioritized queue ID location identifies a queue whose data stream is scheduled to be transmitted, wherein each wired node and wireless node includes up to eight queues.

11. The method of claim 9, wherein the end-to-end delay requirement is a summation of delays at all the nodes along a routing path, the end-to-end delay includes an upper layer queueing delay and a TSN delay according to an equation of, (end to end (E2E) Delay=Upper Layer Delay+E2E TSN Delay).

12. The method of claim 11, wherein an upper layer queueing delay is measured at the source node, and is a time difference from a time that data traffic is produced to a time the data traffic reaches a link layer.

13. The method of claim 11, wherein the TSN delay is determined per an equation of: E2E TSN delay $\Sigma_{i=0}^{N} D_s^i$: where ($D_s^i$=TSN Queuing time+Optional Backoff time+Total TX time+Propagation time+Total guard time), is a time difference from a time that data traffic reaches the link layer at the data traffic source node to a time the data traffic reaches the link layer of a destination node, wherein the data traffic is forwarded up to an application without a delay.

14. The method of claim 9, wherein the data period is an amount of time according to which the data is produced or generated.

15. The method of claim 9, wherein the number of frames within each period includes data frames that need to be transmitted as a stream, wherein an inter-frame-guard-time separates transmission of two consecutive frames, and wherein the size of the frame is measured as number of data bits.

16. The method of claim 5, wherein the time-critical TSN data streams are to be delivered to meet an end-to-end delay requirement and the best effort data is transmitted if the TSN data streams do not occupy a whole scheduling period determined according to:

$$h_p = \text{LCM}(s_i.T, \forall s_i \in S),$$

where the whole scheduling period is $h_p$;
where the LCM is a Least Common Multiple (LCM);
where the $s_i.T$ is a time length of a stream period;
where the $\forall s_i \in S$ includes the TSN stream as a periodic data flow from a source node to one or more destination nodes, such that S is a set of streams in the TSN, or a wireless TSN network, and for a stream $s_i \in S$ from the source node $v_a$ to the destination node $v_b$, $s_i$ is represented as $<s_i.E2E, s_i.F, s_i.G, s_i.T, s_i.P>$,
where $s_i.E2E$ is an end-to-end delay requirement;
where $s_i.L$ is a total number of bits in a stream;
where $s_i.F$ is a number of frames in the stream;
where $s_i.G$ is a inter frame guard time for consecutive transmission of frames, e.g., SIFS in a WiFi based TSN;
where $s_i.T$ is a time length of a stream period; and
where $s_i.P$ is a routing path of the stream with the source node $v_a$ and the destination node $v_b$.

17. A system for scheduling data traffic in a wireless time sensitive network (TSN) having nodes that are wired nodes and wireless nodes, comprising:
 a computer in communication with a memory, the computer is configured to
  synchronize clocks of all nodes with a common clock in the TSN, then a network scheduler communicates with a set of nodes to deliver data traffic to the TSN, to prioritize the data traffic as TSN data streams classified as time critical data traffic and non-time critical data traffic;
  determine link layer routing paths using the data traffic and stored routing protocol data, then compute for each link layer routing path, a link communication delay for each link of one or more relay nodes connecting a source node to a destination node for each TSN stream using a network scheduler;
  determine interfering links for each wireless link using the network scheduler, wherein the interfering links do not have an overlapping transmission time, then determine a scheduling period using the network scheduler, for transmission of each TSN stream at least once in a scheduling period;
  determine optimal scheduling using an optimal scheduling module, to generate a gate control list for each egress port of the wired node and a wireless transmitter of the TSN, then generate the gate control list for each egress port of the wired node and the wireless transmitter of the TSN; and
  begin transmission of the data based on the generated gate control list.

18. The system of claim 17, wherein the link communication delay includes a transmission duration that is a portion of a link delay, the transmission duration includes a total transmission time to transmit all frames in the TSN stream and a total inter-frame-guard-time and a propagation time, and the link delay includes a queueing delay.

19. A system for scheduling data traffic in a wireless time sensitive network (TSN), comprising:
 a computer in communication with a memory, the computer is configured to
  synchronize clocks of all nodes with a common clock in the TSN, wherein the nodes include end nodes and relay nodes, the end nodes include wired and wireless data source and destination nodes, and relay nodes include wired and wireless bridges/switches/routers/access points;
  obtain data traffic information using a network scheduler for the TSN to establish routing paths, by communicating with the wired and wireless end nodes for TSN data traffic, wherein the TSN data traffic includes TSN data streams and the best effort data traffic, wherein the TSN data stream is time prioritized into time critical data traffic and the best effort traffic data is classified as non-time critical data;
  determine routing paths using the obtained data traffic information and stored routing information via the memory, wherein each routing path begins from a source node and ends at a destination node, along with one or more relay nodes connecting the source node to the destination node;
  compute a link communication delay for each link of the one or more relay nodes connecting the source node to the destination node for each TSN stream using a network scheduler, wherein the link communication delay includes a transmission duration that is a portion of a link delay that includes a queueing delay, wherein the queueing delay is determined by an optimal scheduling module, wherein transmission duration includes a total time to transmit all frames in the TSN stream and a total inter-frame-guard-time;
  determine interfering links for each wireless link using the network scheduler, wherein the interfering links do not have an overlapping transmission time;
  determining a scheduling period using the network scheduler, for transmission of each TSN stream at least once in a scheduling period;
  determine optimal scheduling using an optimal scheduling module, wherein a schedule for a TSN stream is a transmission window in a form of a Node ID, a Queue ID, a Time Offset and a Transmission Duration, wherein for a queue identified by the Queue ID of a node identified by the Node ID, the Time Offset corresponds to a gate open time, and the Time Offset plus the Transmission Duration corresponds to a gate close time, to generate a gate control list for each egress port of the wired node and a wireless transmitter of the TSN;
  generate the gate control list for each egress port of the wired node and the wireless transmitter of the TSN; and
  begin transmission of the data based on the generated gate control list.

20. A non-transitory computer readable storage medium embodied thereon a program executable by a computer for performing a method, the method for scheduling data traffic in a wireless time sensitive network (TSN), comprising:
 synchronizing clocks of all nodes with a common clock in the TSN, wherein the nodes include end nodes and relay nodes, the end nodes include wired and wireless data source and destination nodes, and relay nodes include wired and wireless bridges/switches/routers/access points;
 obtaining data traffic information using a network scheduler for the TSN to establish routing paths, by communicating with the wired and wireless end nodes for TSN data traffic, wherein the TSN data traffic includes TSN data streams and best effort data traffic, wherein the TSN data stream is time prioritized into time critical data traffic and the best effort traffic data is classified as non-time critical data;
 determining routing paths using the obtained data traffic information and stored routing information via the memory, such that each routing path begins from a source node and ends at a destination node, along with one or more relay nodes connecting the source node to the destination node;
 computing a link communication delay for each link of the one or more relay nodes connecting the source node to the destination node for each TSN stream using a network scheduler, wherein the link communication delay includes a transmission duration that is a portion of a link delay that includes a queueing delay, wherein the queueing delay is determined by an optimal scheduling module, wherein transmission duration includes a total time to transmit all frames in the TSN stream and a total inter-frame-guard-time;
 determining interfering links for each wireless link using the network scheduler, wherein the interfering links do not have an overlapping transmission time;

determining a scheduling period using the network scheduler, for transmission of each TSN stream at least once in a scheduling period;

determining optimal scheduling using an optimal scheduling module, wherein a schedule for a TSN stream is a transmission window in a form of a Node ID, a Queue ID, a Time Offset and a Transmission Duration, wherein for a queue identified by the Queue ID of a node identified by the Node ID, the Time Offset corresponds to a gate open time, and the Time Offset plus the Transmission Duration corresponds to a gate close time, to generate a gate control list for each egress port of the wired node and a wireless transmitter of the TSN;

generating the gate control list for each egress port of the wired node and the wireless transmitter of the TSN; and starting transmission of the data based on the generated gate control list.

* * * * *